(12) United States Patent
Otsuka et al.

(10) Patent No.: US 12,145,294 B2
(45) Date of Patent: Nov. 19, 2024

(54) METHOD FOR RECYCLING CONTAINERS

(71) Applicant: Kao Corporation, Tokyo (JP)

(72) Inventors: Takahiro Otsuka, Tokyo (JP); Daisuke Kodama, Tokyo (JP)

(73) Assignee: Kao Corporation, Tokyo (JP)

( * ) Notice: Subject to any disclaimer, the term of this patent is extended or adjusted under 35 U.S.C. 154(b) by 768 days.

(21) Appl. No.: 17/281,130

(22) PCT Filed: Aug. 30, 2019

(86) PCT No.: PCT/JP2019/034170
§ 371 (c)(1),
(2) Date: Mar. 29, 2021

(87) PCT Pub. No.: WO2021/038838
PCT Pub. Date: Mar. 4, 2021

(65) Prior Publication Data
US 2021/0354333 A1 Nov. 18, 2021

(51) Int. Cl.
*B29B 17/04* (2006.01)
*B29B 9/10* (2006.01)
(Continued)

(52) U.S. Cl.
CPC ............. *B29B 17/04* (2013.01); *B29B 9/10* (2013.01); *B29B 17/0042* (2013.01); *B29C 48/21* (2019.02); *B29L 2031/7158* (2013.01)

(58) Field of Classification Search
CPC ...................................................... B29B 17/04
See application file for complete search history.

(56) References Cited

U.S. PATENT DOCUMENTS 5,958,659 A 9/1999 Takahashi
6,663,929 B1 * 12/2003 Tabota ................... B29B 17/02
428/903.3
(Continued)

FOREIGN PATENT DOCUMENTS

CN 1221372 A 6/1999
EP 3 483 086 A1 5/2019
(Continued)

OTHER PUBLICATIONS

Extended European Search Report Issued Aug. 31, 2021 in European Patent Application No. 19943426.3, 9 pages.
(Continued)

*Primary Examiner* — Nahida Sultana
*Assistant Examiner* — Virak Nguon
(74) *Attorney, Agent, or Firm* — Oblon, McClelland, Maier & Neustadt, L.L.P.

(57) ABSTRACT

A method for recycling containers, including the following steps (1) to (4): a collecting step (1) of collecting containers, each of which is made of a sheet material including a plurality of layered film layers including a first resin film layer and a second resin film layer, is formed into a bag by attaching at least a part of a periphery of the sheet material to form a containing region for accommodating a content inside the second resin film layer, and includes, between the first resin film layer and the second resin film layer, a film attached portion and a filler enclosed portion; a shredding and washing step (2) of shredding the containers to obtain shreds, and washing the shreds; a recycled resin forming step (3) of forming a recycled resin by using the shreds; and a sheet material forming step (4) of forming at least a part of the sheet material by using the recycled resin.

18 Claims, 8 Drawing Sheets

(51) Int. Cl.
    *B29B 17/00*    (2006.01)
    *B29C 48/21*    (2019.01)
    *B29L 31/00*    (2006.01)

(56) References Cited

U.S. PATENT DOCUMENTS

| | | | |
|---|---|---|---|
| 2008/0191069 | A1 | 8/2008 | Hofmann et al. |
| 2017/0144800 | A1 | 5/2017 | Lucchese et al. |
| 2018/0207914 | A1* | 7/2018 | Liang ............... B32B 27/14 |
| 2019/0168941 | A1* | 6/2019 | Otsuka ............ B65D 65/40 |
| 2019/0330442 | A1* | 10/2019 | Shin ............... B29B 7/885 |

FOREIGN PATENT DOCUMENTS

| | | | |
|---|---|---|---|
| EP | 3 492 403 A1 | 6/2019 | |
| JP | 8-281644 A | 10/1996 | |
| JP | 9-220721 A | 8/1997 | |
| JP | 10-146828 A | 6/1998 | |
| JP | 10-323833 A | 12/1998 | |
| JP | 2002-120320 A | 4/2002 | |
| JP | 2002-200664 A | 7/2002 | |
| JP | 2008-532762 A | 8/2008 | |
| JP | 2014-034424 A | 2/2014 | |
| JP | 6193535 B1 * | 9/2017 | ........... B65D 1/0246 |
| JP | 2019-81608 A | 5/2019 | |
| JP | 2019081608 A * | 5/2019 | |
| WO | WO-03070376 A1 * | 8/2003 | ............... B03B 5/28 |
| WO | WO 2018/163269 A1 | 9/2018 | |

OTHER PUBLICATIONS

International Search Report issued Oct. 15, 2019 in PCT/JP2019/034170 filed Aug. 30, 2019, 2 pages.

Japanese Office Action issued Jan. 30, 2024 in Japanese Patent Application No. 2023-030942 (with unedited computer generated English translation), 6 pages.

* cited by examiner

METHOD FOR RECYCLING CONTAINERS

TECHNICAL FIELD

The present invention relates to a method for recycling containers.

BACKGROUND ART

As a sheet material container having a structure in which a plurality of films are layered and a filler, such as air, enclosed between layers of the films, for example, Patent Document 1 describes a sheet material container including an inner container that accommodates a content to be accommodated, and a cover made of a covering sheet material obtained by the layer stack of a plurality of film layers for covering the inner container. The covering sheet material includes a film region (attached region) where the plurality of film layers are attached to one another, and a filler enclosed portion bulged out to a thickness direction of the covering sheet material than the film region because a filler such as air is present between the plurality of film layers. The sheet material container further includes an outside air introducing portion for introducing the outside air between the inner container and the cover.

CITATION LIST

Patent Document 1: Japanese Patent No. 6193535

SUMMARY OF THE INVENTION

The present invention relates to a method for recycling containers, including the following steps (1) to (4): a collecting step (1) of collecting containers, each of which is made of a sheet material including a plurality of layered film layers including a first resin film layer and a second resin film layer, is formed into a bag by attaching at least a part of a periphery of the sheet material to form a containing region for accommodating a content inside the second resin film layer, and includes, between the first resin film layer and the second resin film layer, a film attached portion where the first resin film layer and the second resin film layer are attached to each other, and a filler enclosed portion that encloses a filler and is bulged out to a thickness direction of the sheet material than the film attached portion; a shredding and washing step (2) of shredding the containers collected in the collecting step to obtain shreds, and washing the shreds; a recycled resin forming step (3) of forming a recycled resin by using the shreds shredded and washed in the shredding and washing step; and a sheet material forming step (4) of forming at least a part of the sheet material by using the recycled resin formed in the recycled resin forming step.

DESCRIPTION OF EMBODIMENTS

Figure 1:
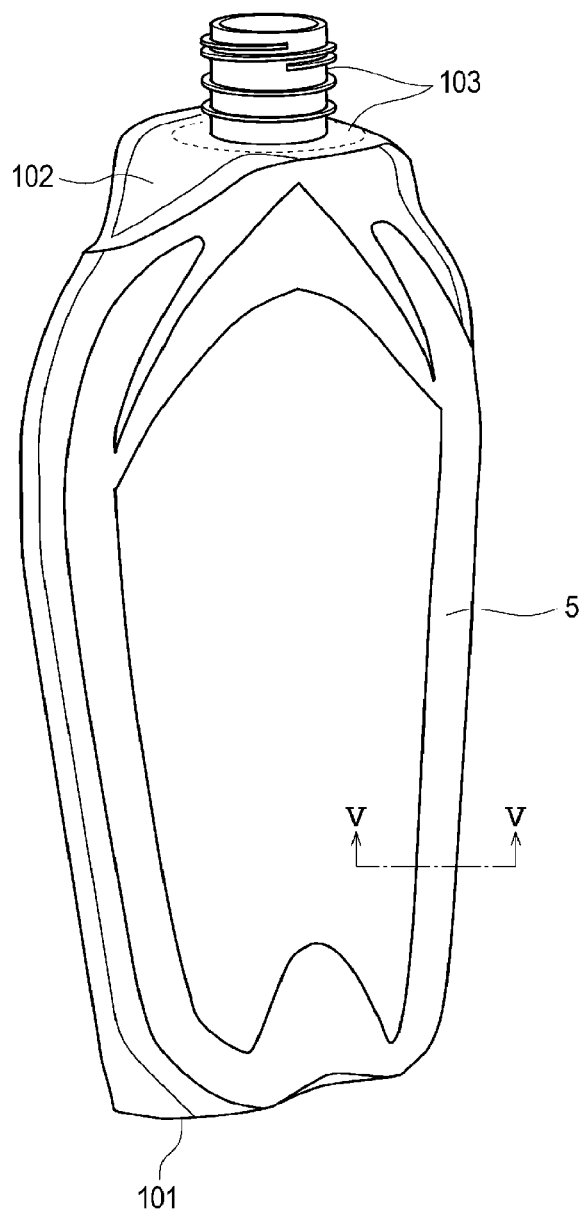
FIG. 1 is a perspective view illustrating an example of a container to be collected in a method for recycling containers according to an embodiment of the invention.

A sheet material container described in Patent Document 1 keeps its structure because a filler is enclosed in a filler enclosed portion, and hence, a sheet material can be thinned. Besides, when its content has been used up, its rigidity can be lost by removing the filler from the filler enclosed portion such that the container can be squashed, and thus, waste can be reduced.

In order to further reduce environmental load, however, there is a demand for further improvement of recyclability of such a sheet material container, and in particular, there are demands for a sheet material container recyclable into a container and a recycling method for the sheet material container. According to examination made by the present inventor, although the sheet material container described in Patent Document 1 is excellent in that waste can be reduced, there is room for further improvement in the quality and the like of a recycled material (such as a sheet material) recycled from the sheet material container.

According to the present invention, a method for recycling containers that can be easily separately collected, and can be recycled into a container can be provided.

Now, a preferred embodiment of the present invention will be described with reference to the accompanying drawings. It is noted that similar components are denoted by the same reference characters throughout the drawings, and overlapping descriptions will not be repeated.

[Outline]

First, referring to FIGS. 2 and 4, the outline of the embodiment of a method for recycling containers according to the present invention will be described.

The method for recycling containers of the present invention embraces the following embodiment.

The method for recycling containers of the present embodiment includes: a collecting step (1) of collecting containers, each of which is made of a sheet material including a plurality of layered film layers including a first resin film layer 1 and a second resin film layer 2, is formed into a bag by attaching at least a part of a periphery of the sheet material to form a containing region for accommodating a content inside the second resin film layer 2, and includes, between the first resin film layer 1 and the second resin film layer 2, a film attached portion where the first resin film layer 1 and the second resin film layer 2 are attached to each other, and a filler enclosed portion 5 that encloses a filler and is bulged out to a thickness direction of the sheet material than the film attached portion; a shredding and washing step (2) of shredding the collected containers to obtain shreds, and washing the shreds; a recycled resin forming step (3) of forming a recycled resin by using the shreds thus shredded and washed; and a sheet material forming step (4) of forming at least a part of the sheet material by using the recycled resin thus formed.

Figure 2:
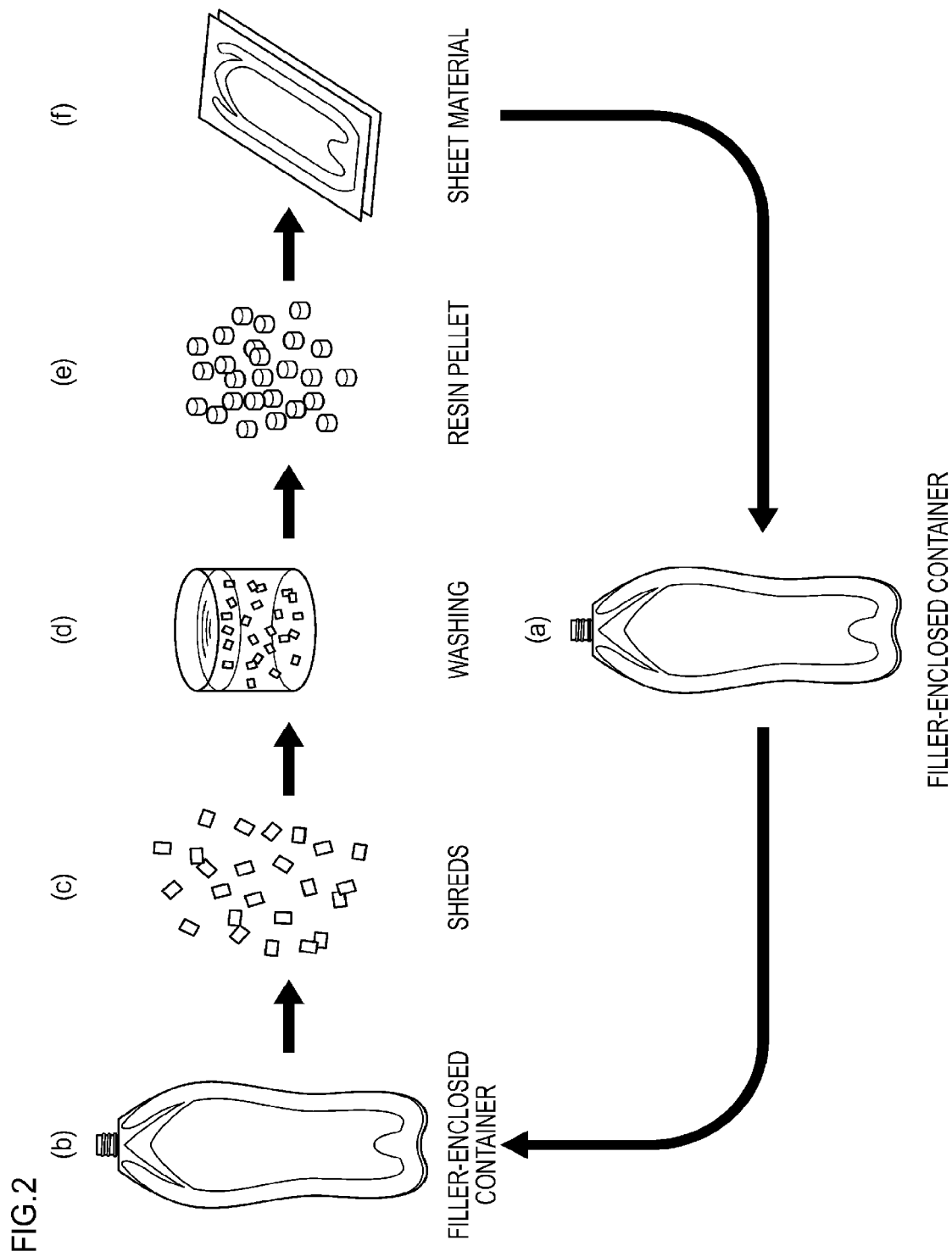
FIG. 2 is a process chart illustrating an example of the method for recycling containers according to the embodiment.
Figure 4:
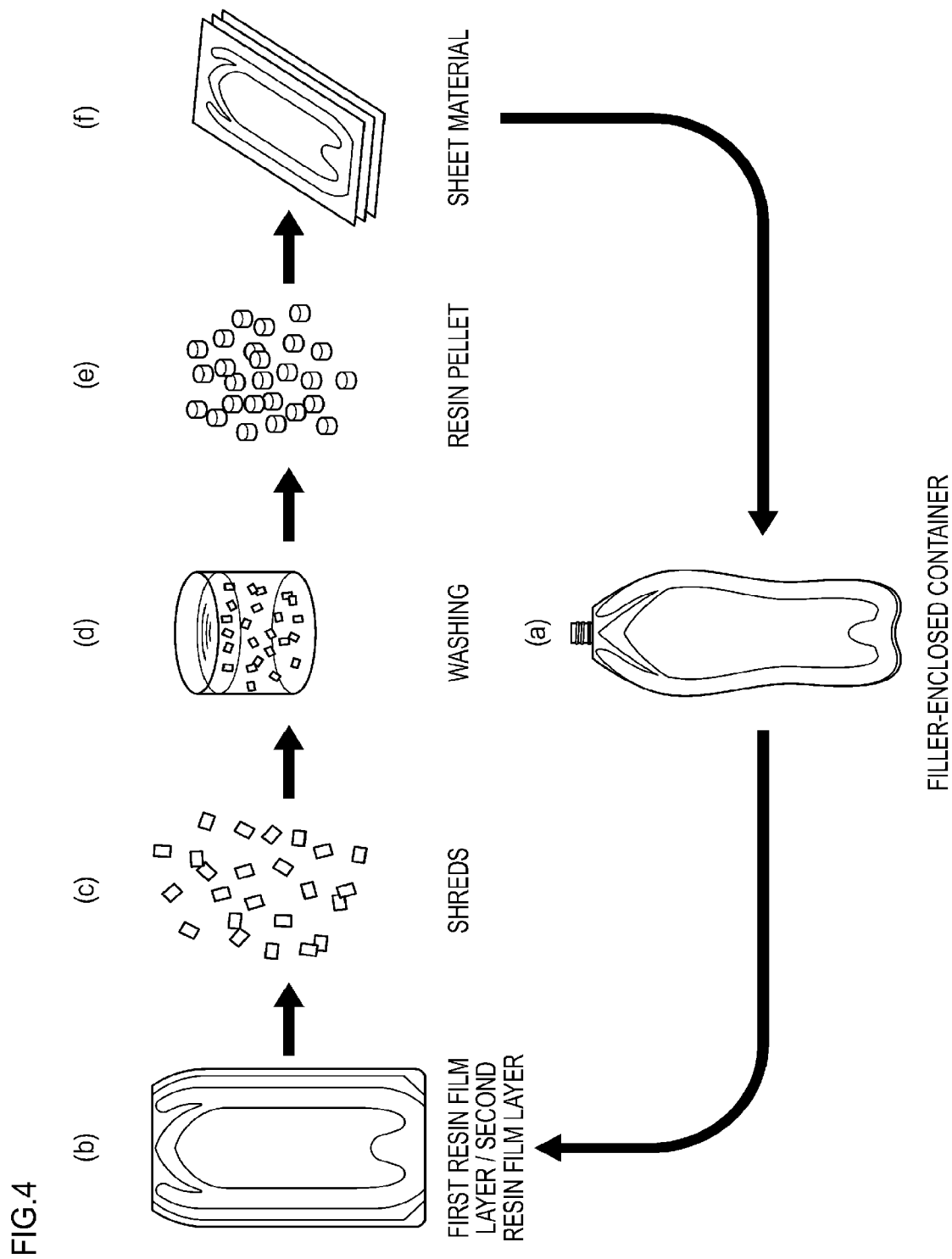
FIG. 4 is a process chart illustrating a modification of the method for recycling containers according to the embodiment.

Specifically, the method for recycling containers of the present embodiment is a resource recovery and recycle method (material recycle method) for containers in which, as illustrated in FIGS. 2 and 4, containers each enclosing a filler (filler enclosed containers) are collected to form a recycled resin (such as a resin pellet) as a recyclable material, and a sheet material for containers is formed as a recycled material by using the recycled resin.

[Containers to be Collected in Collecting Step]

Next, referring to FIGS. 1 to 8, the containers to be collected in the collecting step of the method for recycling containers of the present embodiment will be described in detail.

Figure 5:
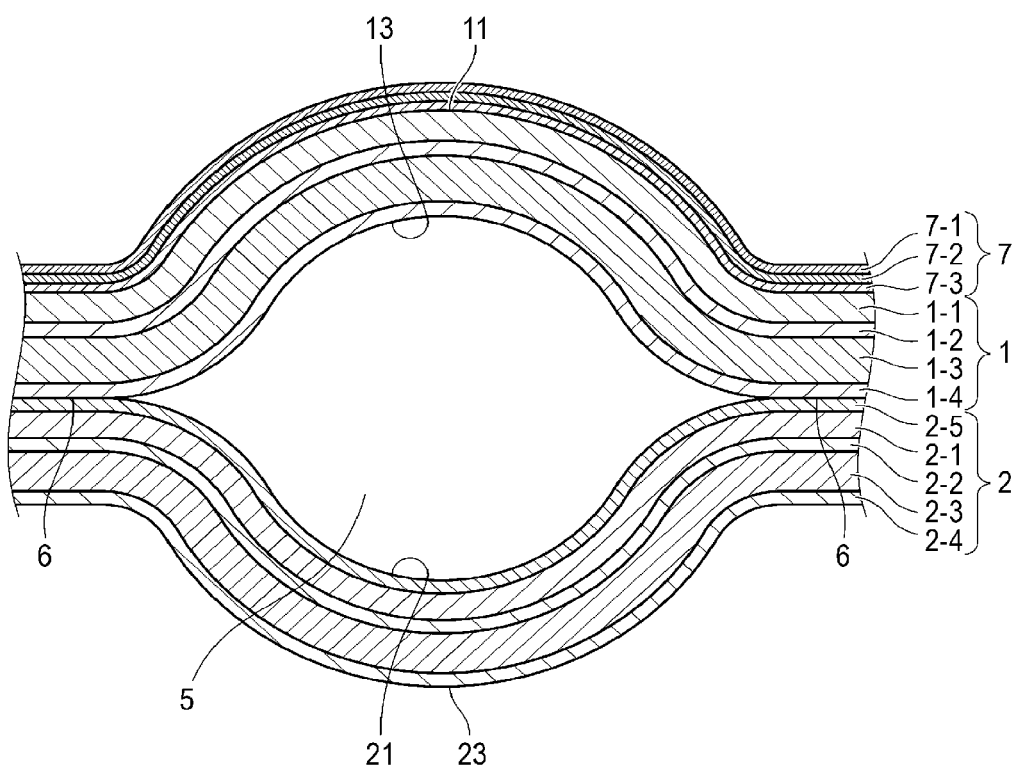
FIG. 5 is a cross-sectional view of film layers taken along line V-V of FIG. 1.
Figure 6:
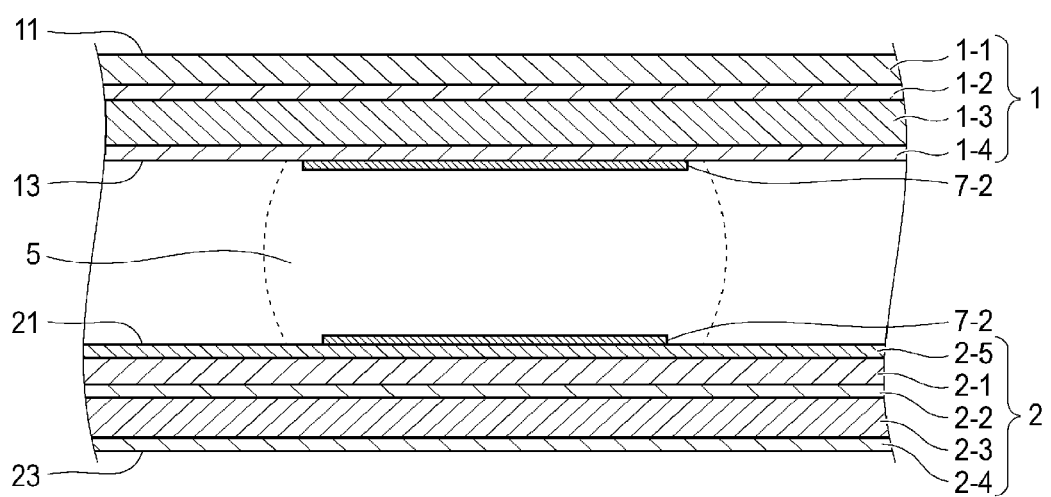
FIG. 6 is a cross-sectional view of film layers of a modification of the container to be collected in the method for recycling containers according to the embodiment.

Each container to be collected in the collecting step of the method for recycling containers (of a first aspect) of the present embodiment is, as illustrated in, for example, FIGS. 5 and 6, a container that is made of a sheet material including a plurality of layered film layers including a first resin film layer 1 and a second resin film layer 2, is formed into a bag by attaching at least a part of a periphery of the sheet material for forming a containing region for accommodating a content inside the second resin film layer 2.

This container includes, as illustrated in, for example, FIG. 5, between the first resin film layer 1 and the second resin film layer 2 disposed inside the first resin film layer 1, a film attached portion where the first resin film layer 1 and the second resin film layer 2 are attached to each other, and a filler enclosed portion 5 bulged out to a thickness direction of the sheet material than the film attached portion because a filler is present therein. Between the first resin film layer 1 and the second resin film layer 2, another non-attached region may be provided in addition to the film attached portion and the filler enclosed portion 5.

Figure 7:
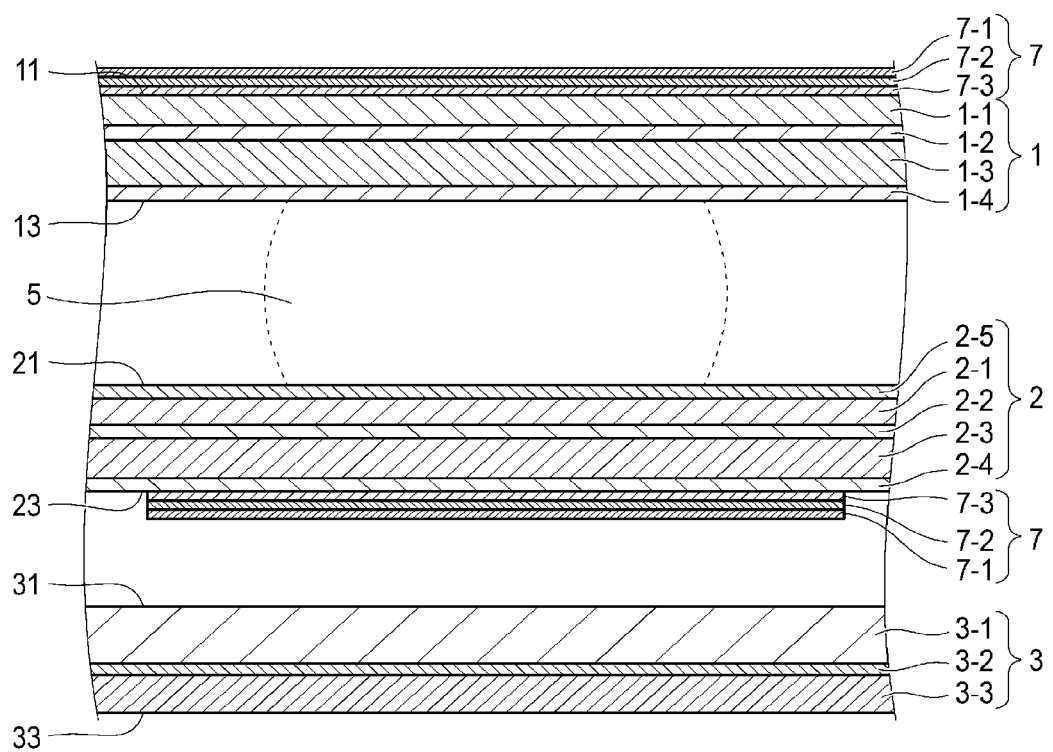
FIG. 7 is a cross-sectional view of film layers of another modification of the container to be collected in the method for recycling containers according to the embodiment.
Figure 8:
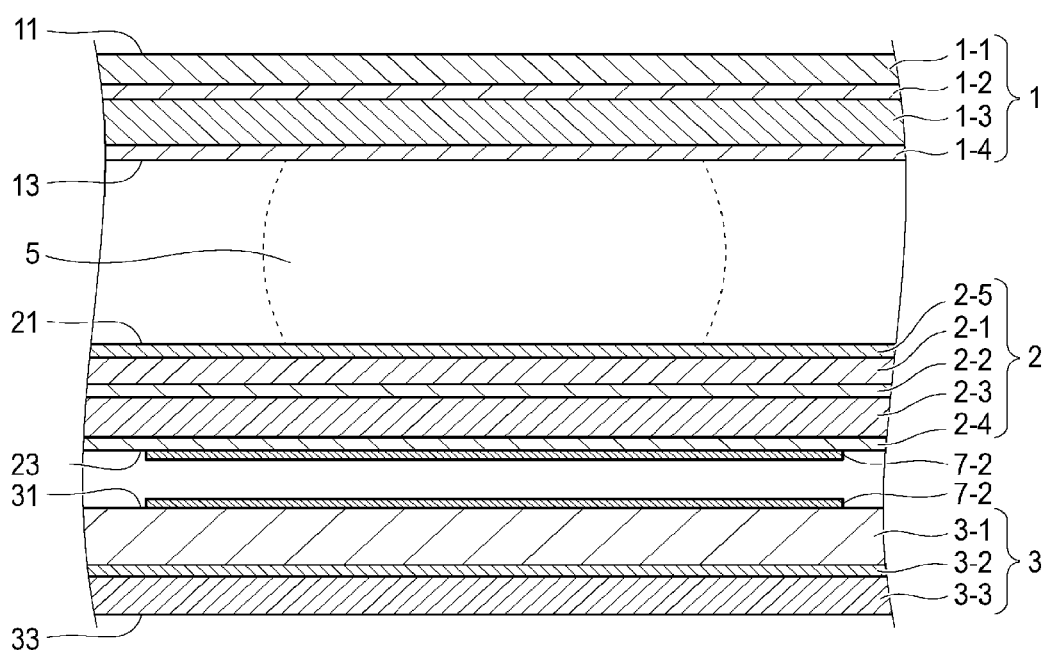
FIG. 8 is a cross-sectional view of film layers of still another modification of the container to be collected in the method for recycling containers according to the embodiment.

Alternatively, each container to be collected in the collecting step of the first aspect may be a container, as illustrated in, for example, FIGS. 7 and 8, made of a sheet material that includes, in addition to the first resin film layer 1 and the second resin film layer 2, a third film layer 3 made of a resin material (a flexible material made of a polymer resin material) disposed inside the second resin film layer 2, and formed into a bag by attaching at least a part of the periphery of the sheet material to form a containing region for accommodating a content inside the third film layer 3.

In this container, also the third film layer 3 is made of the resin material, and hence, the entire container including the third film layer 3 can be collected as it is to be subjected to the next shredding and washing step.

Figure 3:
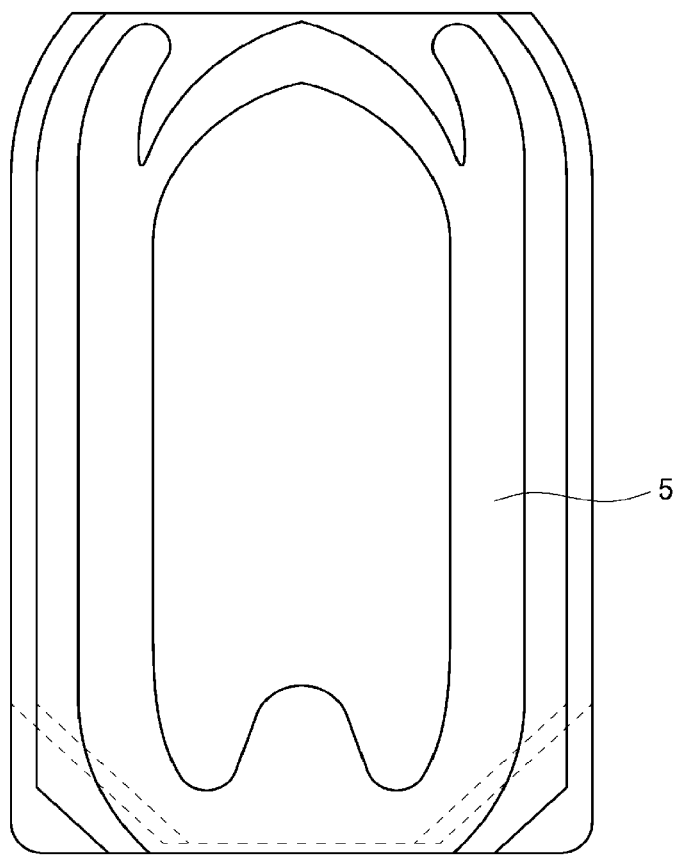
FIG. 3 is a front view of an outer container separated from the container to be collected in the method for recycling containers according to the embodiment.

In a modification (a second aspect) of the method for recycling containers of the present embodiment, from the container made of the sheet material that includes, in addition to the first resin film layer 1 and the second resin film layer 2, the third film layer 3 made of a resin material and/or a non-resin material (a material made of a material not containing a polymer resin) disposed inside the second resin film layer 2, and is formed into a bag by attaching at least a part of the periphery of the sheet material to form the containing region for accommodating a content inside the third film layer 3, the first resin film layer 1 and the second resin film layer 2 as illustrated in, for example, FIG. 3 may be separately collected in the collecting step. In the second aspect, a step of washing a residue of the content having been accommodated in the collected container can be omitted.

It is noted, in FIGS. 6 to 8, that the first resin film layer 1, the second resin film layer 2 and the third film layer 3 are illustrated to be away from one another for convenience sake so that the film structure of the container to be collected in the method for recycling containers of the present embodiment can be easily understood. When attached to one another in the form of a film, however, these film layers may be in contact with one another in a non-attached state in the filler enclosed portion 5 after removing the filler and in the non-attached region.

The filler enclosed portion 5 of the container is, as illustrated in, for example, FIG. 1, formed to be continuous along the periphery of a container main body. When the filler enclosed portion 5 encloses the filler and bulges out to the thickness direction of the sheet material, rigidity is imparted to the container main body. Specifically, high self-standing property, compressive strength, and squeeze-back property are imparted to the container main body.

The filler enclosed portion 5 may be formed in the form of a plurality of independent portions instead of a continuous portion, may be formed in another region except for the periphery of the container main body, and its number and formation region are not especially limited. When the content accommodated in the container has been used up, the container main body loses the rigidity by removing the filler from the filler enclosed portion 5, and hence, the container main body can be easily squashed. In the present embodiment, the container main body from which the filler has been removed may be collected, or the filler may be removed from the filler enclosed portion 5 after collecting the container. Alternatively, when the filler is a gas and the like, the removal of the filler and shredding may be simultaneously performed by directly shredding the collected container.

The filler enclosed in the filler enclosed portion 5 may be a fluid (a gas or a liquid), a solid (such as a particulate or a resin pellet), or a semisolid (such as a foam), and from the viewpoint of easiness in removing the filler after the collection of the container, the filler is preferably a gas. Examples of the gas to be used as the filler include, air, nitrogen, oxygen, and an inert gas (such as argon or helium), and from the viewpoint of cost, the gas is more preferably air.

The container including the filler enclosed in the filler enclosed portion 5 to be collected in the method for recycling containers of the present embodiment may be provided with, as illustrated in, for example, FIG. 1, a bottom gusset portion 101 corresponding to a bottom of the container for obtaining a self-standing form, and may be further provided with a top gusset portion 102 corresponding to a top surface of the container at an opposite end to the bottom gusset portion 101. Alternatively, the container may be in a form supposed not to self-stand but to be set down.

The container to be collected in the method for recycling containers of the present embodiment may be further provided with an opening through which the content is put or discharged. The opening may be further provided with a spout 103, as illustrated in, for example, FIG. 1, sealed by a cap with a pump or the like. The spout 103 is preferred to be made of the same material as any of the film layers, or is preferred to be easily separated, from the film layers from the viewpoint of improving the recyclability. The spout 103 may be provided with a screw thread to be used for sealing the opening. Alternatively, the container to be collected in the method for recycling containers of the present embodiment may have a structure in which a part of the sealed film layers is cut to be opened.

The container to be collected in the method for recycling containers of the present embodiment is an empty container in which the content accommodated in the containing region has been used up, and the type of content is not especially limited but examples include a shampoo, a rinse, a body wash, a facial wash, a detergent, a bleach, a softener, a drink, food, an engine oil, and the like. A small amount of the content remaining in the containing region of the container before and/or after collecting the container is almost removed by washing. When the container to be collected includes a printed layer 7 removable by washing with an aqueous solvent described later, also the content is preferably removable with the aqueous solvent from the viewpoint that the residue of the content can be washed and removed simultaneously with the printed layer 7.

The content may be a liquid (including a paste), or may be a solid (such as a particulate (including granular) substance, or a powdered substance).

When the content is a liquid, its viscosity is, for example, at 30° C., preferably 1 mPa·s or more and 120,000 mPa·s or less, and more preferably 60,000 mPa·s or less (all measured with a B-type viscometer (such as Viscometer TV-10 or Viscometer TVB-10, manufactured by Toki Sangyo Co., Ltd.)).

[Structure of Container to be Collected in First Aspect]

Next, referring to FIGS. 5 to 8, the structure of the container to be collected in the first aspect of the method for recycling containers of the present embodiment will be described in more detail.

The container to be collected in the first aspect is made of the sheet material including the plurality of layered film layers including the first resin film layer 1 and the second resin film layer 2, and includes the containing region formed so as to accommodate the content inside the second resin film layer 2 directly, namely, to accommodate the content to be in direct contact with the second resin film layer 2, or indirectly, namely, to accommodate the content to be in direct contact with an inner portion of another film layer disposed inside the second resin film layer 2. The container includes the film attached portion and the filler enclosed portion 5 between the first resin film layer 1 and the second resin film 2.

Specifically, the container is made of the sheet material including the plurality of layered film layers including the first resin film layer 1 made of a resin material as an outermost film layer (film layer that is disposed on the outermost side when formed into the container, and covers the entire container), and the second resin film layer 2 made of a resin material and disposed inside the first resin film layer 1 (on the inner side of the container). In other words, the second resin film layer 2 is disposed inside the first resin film layer 1 corresponding to the outermost film layer, and the containing region to accommodating the content and formed into a bag by attaching at least a part of the periphery of the sheet material is present inside the second resin film layer 2. The container to be collected in the first aspect may have a structure in which one or more resin film layers are further disposed between the second resin film layer 2 and the containing region as in the structure illustrated in, for example, FIGS. 7 and 8 (the structure in which the third film layer 3 made of a resin material is disposed inside the second resin film layer).

Between the first resin film layer 1 and the second resin film layer 2, the filler enclosed portion 5 bulged out to the thickness direction of the sheet material than the film attached portion because the filler is present therein, and the film attached portion, formed to surround the filler enclosed portion 5, where the first resin film layer 1 and the second resin film layer 2 are attached to each other are provided.

When the first resin film layer 1 and the second resin film layer 2 are made of resin materials having heat sealability, the film attached portion is preferably attached by heat sealing. Conditions for the heat sealing employed here may be appropriately set in accordance with the characteristics of the resin materials, and the heat sealing is performed, for example, at a sealing temperature of 110° C. or more and 230° C. or less, a sealing pressure of 0.1 MPa or more and 1.0 MPa or less, and a sealing time of 0.1 seconds or more and 10 seconds or less.

Here, each of the first resin film layer 1 and the second resin film layer 2 of the container to be collected in the first aspect is a resin layer (layer made of a resin material) working as a substrate of the sheet material and is preferably made of, but is not limited to, for example, nylon (Ny), polyethylene terephthalate (PET), polytrimethylene terephthalate (PTT), polybutylene terephthalate (PBT), polyethylene naphthalate (PEN), polybutylene naphthalate (PBN), polylactic acid (PLA), polyhydroxyalkanoate (PHA), polyethylene (PE), an ethylene-vinyl alcohol copolymer (EVOH), polypropylene (PP), an acrylonitrile-butadiene-styrene copolymer (ABS), polyvinyl chloride (PVC), polycarbonate (PC), polystyrene (PS) or the like.

Besides, each of the first resin film layer 1 and the second resin film layer 2 may be made of a single substrate layer (layer working as the substrate of the film), or may have a structure including a plurality of substrate layers laminated, or a plurality of substrate layers and other layers (such as an added layer and a bonded layer) laminated. The laminating may be in either of a structure in which layers are laminated by heat seal bonding (not including a lamination bonded layer), or a structure including a lamination bonded layer laminated by bonding by dry lamination, extrusion lamination, coextrusion molding or the like. When the lamination bonded layer is included, the lamination bonded layer may contain a material different from the resin material, such as a metal deposition layer.

Besides, as another layer (added layer) different from the substrate layer of the film layer, a layer working as an underlayer for the printed layer 7 and having a function to make an ink well taken may be provided on a surface of the film layer where the printed layer 7 is formed.

Furthermore, when the container to be collected in the first aspect is made of the sheet material including, in addition to the first resin film layer 1 and the second resin film layer 2, an additional resin film layer made of a resin material, such as the third film layer 3, the additional resin film layer is preferably made of the resin material described above.

An example of the structure of the sheet material of the container to be collected in the first aspect includes the following layer structure:

First, the first resin film layer 1 has a four-layer structure formed by laminating, from the outer side of the container, a substrate layer 1-1, a substrate layer 1-2, a substrate layer 1-3, and a substrate layer 1-4 in the stated order as illustrated in FIGS. 5 to 8.

The substrate layer 1-1 is made of, for example, polyethylene terephthalate (PET) or oriented nylon (ONy). As the principal functions, the substrate layer 1-1 provides glossiness and printability to the outside of the container as well as ensures the rigidity of the container.

The substrate layer 1-2 is, for example, a layer, formed on a surface of the substrate layer 1-2 on the side of the substrate layer 1-1, of deposited transparent PET containing polyethylene terephthalate on which silica and/or alumina are vapor deposited. As the principal function, the substrate layer 1-2 provides a gas barrier property to the container.

The substrate layer 1-3 is made of, for example, oriented nylon. As the principal function, the substrate layer 1-3 ensures pinhole resistance of the container.

The substrate layer 1-4 is made of, for example, linear low density polyethylene (LLDPE). As the principal function, the substrate layer 1-4 ensures heat sealability to the second resin film layer 2 and heat sealability between the first resin film layer 1.

Next, an example of the layer structure of the second resin film layer 2 includes, also as illustrated in FIGS. 5 to 8, a layer structure including, in addition to a layer structure similar to the substrate layers 1-1 to 1-4 of the first resin film layer 1 (substrate layers 2-1 to 2-4), a substrate layer 2-5 made of, for example, linear low density polyethylene (LLDPE). The substrate layer 2-5 is a layer adjacent to the substrate layer 2-1, and forms a surface of the second resin film layer 2 opposite to the substrate layer 2-4. As the principal function, the substrate layer 2-5 ensures heat sealability to the first resin film layer 1.

The layer structures of the first resin film layer 1 and the second resin film layer 2 are, however, not limited to the examples described above, and the materials of each layer included in the first resin film layer 1 and the second resin film layer 2 are also not limited to those described in the examples. Besides, when the sheet material further includes the third film layer 3 made of a resin material, an example of the structure of this third film layer 3 is the same as a structure of the third film layer 3 described in the second aspect below.

The container to be collected in the first aspect preferably contains, in all the plurality of film layers (particularly the substrate layers) included in the sheet material, materials made of the same type of resins (resins the same in molecular skeletons of main chains and side chains as chemical structures of molecules). The materials are preferably any one of polyethylene-based materials such as high density polyethylene (HDPE), middle density polyethylene (MDPE), low density polyethylene (LDPE), linear low density polyethylene (LLDPE), ultra low density polyethylene (ULDPE), and an ethylene-vinyl alcohol copolymer (EVOH), polypropylene-based materials such as oriented polypropylene (OPP), cast polypropylene (CPP), isotactic PP, syndiotactic PP, atactic PP, random PP, and block PP, polyester-based materials such as polyethylene terephthalate (PET), amorphous polyethylene terephthalate (amorphous PET), polybutylene terephthalate (PBT), polyethylene naphthalate (PEN), and polybutylene naphthalate (PBN), or polyamide-based materials such as oriented nylon (ONy), cast nylon (CNy), nylon 6, nylon 66, nylon 11, nylon 12, and MXD6, and are particularly preferably any one of the polyethylene-based materials. Since the container to be collected is made of the polyethylene-based materials, a container recycling system for polyethylene-based materials can be thus constructed, and thus, physical properties and qualities of a recycled material are also further improved.

From the viewpoint of further improving the physical properties and qualities of a recycled material, it is more preferable that the substrate layers of all the film layers of the container are made of the materials of the same type of resins and that the container does not substantially contain another material in addition to these materials. The term "not to substantially contain" means a mass ratio of less than 1%, preferably less than 0.5%, and most preferably 0% of each film.

Besides, in the container to be collected in the first aspect, the outermost layer positioned on the outermost side in the first resin film layer 1 of the sheet material may be made of polyethylene terephthalate (PET) or the like, the layers excluding the outermost layer may be made of polyvinyl alcohol (PVA), and the second resin film layer 2 and the other resin film layer may be made of polyvinyl alcohol (PVA).

Since polyvinyl alcohol can be dissolved and removed by washing with an aqueous solvent, a container recycling system for polyethylene terephthalate can be thus constructed, and the physical properties and quantities of a recycled material can be thus further improved. A suitable example of the polyethylene terephthalate includes biaxially oriented polyethylene terephthalate (biaxially oriented PET).

It is very preferable that a container having a structure in which, for example, the first resin film layer 1 includes a substrate layer 1-1 made of PET and a substrate layer 1-2 made of PVA laminated in the stated order from a surface 11 on the outer side and a surface 13 on the inner side, and all the other resin film layers are a single layer made of PVA. Thus, it is easy to recycle such a container into a polyethylene terephthalate material.

Here, in the present invention, in each film layer of the sheet material included in the container, a surface corresponding to the outer side (outside) of the container in forming the container is referred to as the "outside surface", and a surface corresponding to the inner side (inside (side of the containing region)) of the container is referred to as the "inside surface".

Besides, the container to be collected in the first aspect preferably includes, on at least one surface selected from the outside surface 11 and the inside surface 13 of the first resin film layer 1, and an outside surface 21 and an inside surface 23 of the second resin film layer 2, the printed layer 7 including an ink layer 7-2 and removable from the surface of the film layer by washing with an aqueous solvent. Thus, the printed layer 7 can be easily removed by washing with an aqueous solvent (such as warm water, alkaline water, or acid water) from the shreds of collected container, so as to inhibit coloring of a recycled resin formed by using the washed shreds.

When the container to be collected is a container made of the sheet material further including the third film layer 3 made of a resin material, the printed layer 7 is preferably formed on at least one surface selected from the outside surface 11 and the inside surface 13 of the first resin film layer 1, the outside surface 21 and the inside surface 23 of the second resin film layer 2, and an outside surface 31 and an inside surface 33 of the third film layer 3.

In the present invention, the term "removable by washing with an aqueous solvent" means a structure in which the printed layer 7 is removable from the surface of the film layer through a contact with an aqueous solvent (water, or a hydrophilic solvent containing 50% by mass or more of water), and includes a structure in which the printed layer 7 is removable not only by immersing in or exposed to a flow of the aqueous solvent but also by a method of further applying physical force, such as stirring, electrolytic cleaning, spray cleaning, scrub cleaning, or ultrasonic cleaning. Furthermore, a structure in which the printed layer 7 is removable not only by immersing in the aqueous solvent or the like but also by a method using, for example, heated steam (water vapor) is also included.

Besides, in the present invention, the term "to remove the printed layer" from the surface of the film layer means that at least 90% or more of the ink layer 7-2 of the printed layer 7 formed on the surface of the film layer is removed, and the ratio is preferably 95% or more, and further preferably 98% or more. A structure in which 90% or more of the entire printed layer 7 is removed from the surface may be employed. It is noted that the ratio herein means a mass ratio.

Here, the printed layer 7 is a layer at least including the ink layer 7-2 made of a printing ink (such as a pigment, or a binder resin), and may include, in addition to the ink layer 7-2, a coating layer 7-1 or the like having a function to protect the surface of the ink layer 7-2. The ink layer 7-2 can be formed by, for example, offset printing, screen printing, gravure printing, flexographic printing, or the like. The coating layer 7-1 may be a medium printed layer, that is, a colorless printed layer. The printed layer 7 may further include an underlayer 7-3 soluble in an aqueous solvent in order that the printed layer 7 can be removed by washing with the aqueous solvent. The underlayer 7-3 can be formed by, for example, offset printing, screen printing, gravure printing, flexographic printing or the like, and can be formed by a method different from printing.

The printed layer 7 may have any structure removable, as the printed layer 7, by washing with an aqueous solvent. Specifically, the printed layer 7 may have a structure including, for example, the underlayer 7-3 formed on the surface of the film layer and soluble in an aqueous solvent, the ink layer 7-2 formed on the surface of the underlayer 7-3, and the coating layer 7-1 formed on the surface of the ink layer 7-2 and soluble in the aqueous solvent. When this structure is employed, even if the ink layer 7-2 is not soluble in the aqueous solvent, the printed layer 7 including the ink layer 7-2 is removable by washing with an aqueous solvent from the surface of the film layer because the underlayer 7-3 is soluble in the aqueous solvent. In other words, the entire printed layer including the ink layer 7-2 is removable from the surface of the film layer by washing.

On the other hand, when the printed layer 7 does not include the underlayer 7-3 soluble in an aqueous solvent, the ink layer 7-2 preferably contains a material soluble in the aqueous solvent. For example, a structure in which a binder resin of the ink layer 7-2 (preferably binder resin contained in 30% by mass or more, and more preferably 50% by mass or more of the ink layer 7-2) is made of a material soluble in an aqueous solvent, or a structure in which the binder resin contains, as a part (preferably 5% by mass or more, and more preferably 10% by mass of more) of the binder resin, a binder resin soluble in an aqueous solvent is suitably employed. The thickness (dimension measured vertically to the principal surface of the sheet material) of the printed layer 7 is preferably 0.5 μm or more. For easing the removal by washing, the thickness is preferably 30 μm or less, and more preferably 10 μm or less.

In this manner, after collecting and shredding containers, when washing with an aqueous solvent such as alkaline washing, acid washing, warm water washing, or the like is performed, the printed layer 7 including the ink layer 7-2 can be easily removed from the shreds. As a result, when a recycled resin is produced as a recyclable material from the washed shreds, coloring of the recycled resin is difficult to occur.

In particular, it is suitable to employ a structure in which the printed layer 7 is removable from the surface of the film layer by washing with warm water of 30° C. or more, preferably 40° C. or more, more preferably 50° C. or more, and further preferably 60° C. or more, in other words, it is suitable to employ a structure in which the printed layer 7 contains a material soluble in warm water of 30° C. or more, preferably 40° C. or more, more preferably 50° C. or more, and further preferably 60° C. or more. Thus, the printed layer 7 can be very easily removed by warm water washing, and in addition, there is no need to use, for the washing, not only an organic solvent but also an alkali or an acid, and hence environmental load is very small.

An example of such a material includes a temperature-responsive water-soluble resin that contains a monomer unit A having a hydrophilic group different from a hydrophilic group constituting polymerization related to formation of the resin, and a monomer unit B not having a hydrophilic group different from the hydrophilic group constituting the polymerization related to the formation of the resin, a ratio of the amount of the monomer unit A to the total amount of all monomer units being 5% by mole or more and 35% by mole or less. Alternatively, the material may be a mixture of the water-soluble resin obtained by mixing, with respect to 100 parts by mass of the water-soluble resin, 1 part by mass or more and 10 parts by mass or less of a salt different from the water-soluble resin. Such a temperature-responsive water-soluble resin has excellent moisture resistance as well as an extremely high dissolution rate in warm water of 30° C. or more. Even when this temperature-responsive water-soluble resin is used as the underlayer 7-3, adhesiveness to the ink layer 7-2 or the like is very good.

Now, the temperature-responsive water-soluble resin will be described in detail.

[Monomer Unit A]

The monomer unit A has a hydrophilic group different from a hydrophilic group constituting the polymerization related to the formation of the resin. The monomer unit A is not especially limited as long as it is a monomer unit having the hydrophilic group. Besides, a monomer used for inducing the monomer unit A is called also as a monomer A.

From the viewpoint of improving solubility in neutral water of the water-soluble resin, and from the viewpoint of easing a polymerization reaction performed in producing a water-soluble polyester resin, examples of the hydrophilic group include one or more selected from the group consisting of a primary amino group, a secondary amino group, a tertiary amino group, a quaternary ammonium base, an oxyalkylene group, a hydroxyl group, a carboxyl group, a carboxyl base, a phosphoric acid group, a phosphoric acid base, a sulfonic acid group, and a sulfonic acid base. Among these, from the viewpoint of improving heat resistance of the water-soluble resin, one or more selected from the group consisting of a quaternary ammonium base, an oxyalkylene group, a carboxyl base, a phosphoric acid base, and a sulfonic acid base are preferred, and one or more selected from the group consisting of a quaternary ammonium base, an oxyalkylene group, and a sulfonic acid base are more preferred, and a sulfonic acid base is still more preferred.

From the viewpoint of improving the solubility in neutral water of the water-soluble resin, and from the viewpoint of easing the polymerization reaction performed in producing the water-soluble polyester resin, the sulfonic acid base is preferably a sulfonic acid base represented by $-SO_3M^3$ (wherein $M^3$ represents a counter ion of a sulfonic acid group constituting the sulfonic acid base, and from the viewpoint of improving the solubility in neutral water of the water-soluble resin, is preferably one or more selected from the group consisting of metal ions and ammonium ions, is more preferably one or more selected from the group consisting of metal ions, is further preferably one or more selected from the group consisting of alkali metal ions and alkali earth metal ions, is further preferably one or more selected from the group consisting of alkali metal ions, is further preferably one or more selected from the group consisting of sodium ions and potassium ions, and is still further preferably a sodium ion).

The ratio of the amount of the monomer unit A to the total amount of all the monomer units of the water-soluble resin is, from the viewpoint of improving the solubility in neutral water of the water-soluble resin, 5% by mole or more, preferably 7% by mole or more, more preferably 10% by mole or more, and further preferably 12% by mole or more, and from the viewpoint of improving the moisture resistance, 35% by mole or less, preferably 30% by mole or less, more preferably 20% by mole or less, further preferably 15% by mole or less, and still further preferably 13% by mole or less. Besides, the ratio of the amount of the monomer unit A to the total amount of all the monomer units of the water-soluble resin is, from the viewpoint of improving the solubility in neutral water and the moisture resistance of the water-soluble resin, 5 to 35% by mole, preferably 7 to 30% by mole, more preferably 10 to 20% by mole, and further preferably 12 to 15% by mole.

[Monomer Unit B]

The monomer unit B does not have the hydrophilic group. A monomer used for inducing the monomer unit B is called also as a monomer B.

A ratio of the amount of substance of the monomer unit B in the water-soluble resin to the total amount of substance of all the monomer units of the water-soluble resin is, from the viewpoint of improving the moisture resistance of the water-soluble resin, preferably 15% by mole or more, more preferably 25% by mole or more, and further preferably 30% by mole or more, and from the viewpoint of improving the solubility in neutral water of the water-soluble resin, preferably 45% by mole or less, more preferably 42% by mole or less, and further preferably 40% by mole or less. The ratio of the amount of substance of the monomer unit B in the water-soluble resin to the total amount of substance of all the monomer units in the water-soluble resin is, from the viewpoint of improving the solubility in neutral water and the moisture resistance of the water-soluble resin, preferably 15 to 45% by mole, more preferably 25 to 42% by mole, and further preferably 30 to 40% by mole.

A weight average molecular weight of the water-soluble resin is, from the viewpoint of layer strength of the printed layer 7 and the like, preferably 1,000 or more, more preferably 5,000 or more, further preferably 10,000 or more, and still further preferably 15,000 or more, and from the viewpoint of improving the solubility in neutral water of the water-soluble resin, preferably 80,000 or less, more preferably 50,000 or less, further preferably 30,000 or less, and still further preferably 20,000 or less. It is noted that the weight average molecular weight is measured, in terms of standard polystyrene, by gel permeation chromatography (GPC) using tetrahydrofuran as a solvent.

Examples of the water-soluble resin include a water-soluble polyester resin, a water-soluble polyamide resin, a water-soluble polyimide resin, a water-soluble acrylic resin, a water-soluble polyurethane resin, a water-soluble polyallylamine resin, a water-soluble phenol resin, a water-soluble epoxy resin, a water-soluble phenoxy resin, a water-soluble urea resin, a water-soluble melamine resin, a polyvinyl alcohol resin, and modified products of these resins. One of these, or a combination of two or more of these can be used. Among these, one or more selected from the group consisting of a water-soluble polyester resin and a water-soluble polyamide resin are preferred, and a water-soluble polyester resin is more preferred.

[Water-Soluble Polyester Resin]

An example of the water-soluble polyester resin includes a water-soluble polyester resin containing a hydrophilic monomer unit having the hydrophilic group (monomer unit A), a dicarboxylic acid monomer unit not having the hydrophilic group (monomer unit B), and a diol monomer unit.

(Hydrophilic Monomer Unit)

The water-soluble polyester resin contains the hydrophilic monomer unit having the hydrophilic group. The hydrophilic monomer unit is not especially limited as long as it is a monomer unit having the hydrophilic group, and from the viewpoint of improving the solubility in neutral water and the moisture resistance of the water-soluble resin, is preferably an aromatic dicarboxylic acid monomer unit having the hydrophilic group.

The monomer A is, from the viewpoint of improving the solubility in neutral water and the moisture resistance of the water-soluble resin, and from the viewpoint of easing the polymerization reaction performed in producing the water-soluble polyester resin, preferably one or more selected from the group consisting of carboxylic acids, amines and amino acids, and more preferably a carboxylic acid. Among carboxylic acids, from the same viewpoints, an aromatic carboxylic acid is preferred, and one or more selected from the group consisting of a hydroxy group-containing aromatic dicarboxylic acid, a primary amino group-containing aromatic dicarboxylic acid, a sulfonic acid group-containing aromatic dicarboxylic acid, and a sulfonic acid base-containing aromatic dicarboxylic acid are more preferred. Among these, from the same viewpoints, one or more selected from the group consisting of hydroxy phthalic acids, amino phthalic acids, sulfo-phthalic acids, and sulfo-naphthalene dicarboxylic acids are preferred, one or more selected from the group consisting of sulfo-phthalic acids are more preferred, one or more selected from the group consisting of sulfo-isophthalic acids and sulfo-terephthalic acids are further preferred, and 5-sulfo-isophthalic acid is still further preferred.

The content of the hydrophilic group in the water-soluble polyester resin is, from the viewpoint of improving the solubility in neutral water of the water-soluble resin, preferably 0.5 mmol/g or more, more preferably 0.6 mmol/g or more, and further preferably 0.7 mmol/g or more, and from the viewpoint of improving the moisture resistance, preferably 3.0 mmol/g or less, more preferably 2.0 mmol/g or less, and further preferably 1.5 mmol/g or less. The content of the hydrophilic group in the water-soluble polyester resin is, from the viewpoint of improving the solubility in neutral water and the moisture resistance of the water-soluble resin, preferably 0.5 to 3.0 mmol/g, more preferably 0.6 to 2.0 mmol/g, and further preferably 0.7 to 1.5 mmol/g.

The ratio of the amount of the hydrophilic monomer unit to the total amount of all the monomer units in the water-soluble polyester resin is, from the viewpoint of improving the solubility in neutral water of the water-soluble resin, 5% by mole or more, preferably 7% by mole or more, more preferably 10% by mole or more, and further preferably 12% by mole or more, and from the viewpoint of improving the moisture resistance, 35% by mole or less, preferably 30% by mole or less, more preferably 20% by mole or less, further preferably 15% by mole or less, and still further preferably 13% by mole or less. The ratio of the amount of the hydrophilic monomer unit to the total amount of all the monomer units in the water-soluble polyester resin is, from the viewpoint of improving the solubility in neutral water and the moisture resistance of the water-soluble resin, 5 to 35% by mole, preferably 7 to 30% by mole, more preferably 10 to 20% by mole, and further preferably 12 to 15% by mole.

(Dicarboxylic Acid Monomer Unit not Having Hydrophilic Group)

The water-soluble polyester resin contains the dicarboxylic acid monomer unit not having the hydrophilic group (hereinafter also referred to as the hydrophobic dicarboxylic acid monomer unit). In the present invention, a dicarboxylic acid used for inducing the hydrophobic dicarboxylic acid monomer unit is called also as the dicarboxylic acid.

The dicarboxylic acid is, from the viewpoint of improving the solubility in neutral water and the moisture resistance of the water-soluble resin, and from the viewpoint of easing the polymerization reaction performed in producing the water-soluble polyester resin, preferably one or more selected from the group consisting of aromatic dicarboxylic acids, aliphatic dicarboxylic acids, and alicyclic dicarboxylic acids. Among these, from the same viewpoints, one or more selected from the group consisting of terephthalic acid, isophthalic acid, 2,5-furandicarboxylic acid, 2,6-naphthalenedicarboxylic acid, 1,4-cyclohexanedicarboxylic acid, and 1,3-adamantanedicarboxylic acid are more preferred, one or more selected from the group consisting of terephthalic acid, 2,5-furandicarboxylic acid, and 2,6-naphthalenedicarboxylic acid are further preferred, and 2,6-naphthalenedicarboxylic acid is still further preferred.

A ratio of the amount of substance of the hydrophobic dicarboxylic acid monomer unit in the water-soluble polyester resin to the total amount of substance of all the monomer units in the water-soluble polyester resin is, from the viewpoint of improving the moisture resistance of the water-soluble resin, preferably 15% by mole or more, more preferably 25% by mole or more, and further preferably 30% by mole or more, and from the viewpoint of improving the solubility in neutral water of the water-soluble resin, preferably 45% by mole or less, more preferably 42% by mole or less, and further preferably 40% by mole or less. The ratio of the amount of substance of the hydrophobic dicarboxylic acid monomer unit in the water-soluble polyester resin to the total amount of substance of all the monomer units in the water-soluble polyester resin is, from the viewpoint of improving the solubility in neutral water and the moisture resistance of the water-soluble resin, preferably 15 to 45% by mole, more preferably 25 to 42% by mole, and further preferably 30 to 40% by mole.

A molar ratio between the hydrophilic monomer unit and the hydrophobic dicarboxylic acid monomer unit in the water-soluble polyester resin (the hydrophilic monomer unit/the hydrophobic dicarboxylic acid monomer unit) is, from the viewpoint of improving the solubility in neutral water and the moisture resistance of the water-soluble resin, preferably 10/90 or more, more preferably 15/85 or more, further preferably 18/82 or more, and still further preferably 20/80 or more, and from the same viewpoint, preferably 70/30 or less, more preferably 65/35 or less, further preferably 60/40 or less, still further preferably 40/60 or less, and still further preferably 30/70 or less.

(Diol Monomer Unit)

The water-soluble polyester resin has the diol monomer unit. A diol used for inducing the diol monomer unit is called also as the diol C.

As the diol C, any of aliphatic diols, aromatic diols, and the like can be used. From the viewpoint of production cost of the water-soluble polyester resin, an aliphatic diol is preferred.

The number of carbon atoms of the diol C is, from the viewpoint of improving the solubility in neutral water and the moisture resistance of the water-soluble resin, preferably 2 or more, and from the same viewpoint, preferably 31 or less, more preferably 25 or less, further preferably 20 or less, and still further preferably 15 or less.

Examples of the aliphatic diols include one or more selected from the group consisting of chain diols and cyclic diols. From the viewpoint of improving the solubility in neutral water and the moisture resistance of the water-soluble resin, a chain diol is preferred.

The number of carbon atoms of the chain diol is, from the viewpoint of improving the solubility in neutral water and the moisture resistance of the water-soluble resin, preferably 2 or more, and from the same viewpoint, preferably 6 or less, more preferably 4 or less, further preferably 3 or less, and still further preferably 2.

The diol C may have an ether oxygen atom, and when the diol C is a chain aliphatic diol, the number of ether oxygen atoms is preferably 1 or less from the viewpoint of improving the solubility in neutral water and the moisture resistance of the water-soluble resin, and when the diol C is a cyclic aliphatic diol, the number of ether oxygen atoms is preferably 2 or less from the same viewpoint.

From the viewpoint of improving the solubility in neutral water and the moisture resistance of the water-soluble resin, the chain diol is preferably one or more selected from the group consisting of ethylene glycol, 1,2-propandiol, 1,3-propanediol, diethylene glycol, and dipropylene glycol, and more preferably one or more selected from the group consisting of ethylene glycol, 1,2-propanediol, and 1,3-propanediol, and is further preferably ethylene glycol.

When the diol C contains one or more selected from the group consisting of ethylene glycol, 1,2-propanediol, 1,3-propanediol, diethylene glycol, and dipropylene glycol, a ratio of a total amount of ethylene glycol, 1,2-propanediol, 1,3-propanediol, diethylene glycol, and dipropylene glycol to a total amount of all diol monomer units in the water-soluble polyester resin is, from the viewpoint of improving the solubility in neutral water and the moisture resistance of the water-soluble resin, preferably 80% by mole or more, more preferably 90% by mole or more, further preferably 95% by mole or more, still further preferably 98% by mole or more, still further preferably substantially 100% by mole, and still further preferably 100% by mole. The term "substantially 100% by mole" means that a case where a substance except for ethylene glycol, 1,2-propanediol, 1,3-propanediol, diethylene glycol, and dipropylene glycol is inevitably contained is included.

In the water-soluble polyester resin, ratios of the amounts of the hydrophilic monomer unit and the dicarboxylic acid monomer unit to a total amount of all dicarboxylic acid monomer units including the hydrophilic monomer unit are, from the viewpoint of improving the solubility in neutral water and the moisture resistance of the water-soluble resin, respectively 10 to 70% by mole and 30 to 90% by mole, and in the water-soluble polyester resin, the dicarboxylic acid used for obtaining the dicarboxylic acid monomer unit is preferably 2,6-naphthalenedicarboxylic acid.

An example of the water-soluble polyester resin includes one represented by the following general formula (1):

[Formula 1]

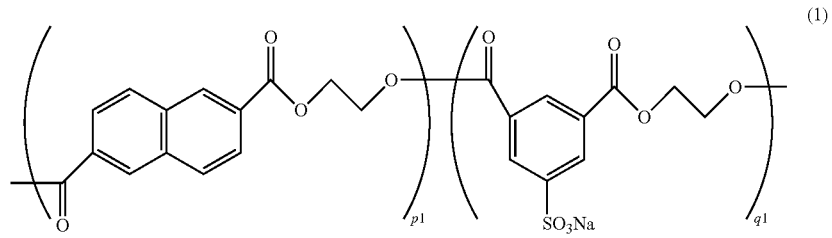

In the general formula (1), p1 represents a degree of polymerization of ethylene 2,6-napthalene carboxylate, and q1 represents a degree of polymerization of ethylene 5-sulfoisophthalate. The ethylene 2,6-naphthalene carboxylate and the ethylene 5-sulfoisophthalate are block-bonded or randomly bonded, and are more preferably randomly bonded from the viewpoint of improving the solubility in neutral water of the water-soluble resin.

The water-soluble polyester resin may have another monomer unit in addition to the hydrophilic monomer unit, the hydrophobic dicarboxylic acid monomer unit, and the diol monomer unit as long as the effects are not impaired.

A method for producing the water-soluble polyester resin is not especially limited, and any of known production methods for a polyester resin can be applied.

(Salt (Component β) Different from Water-Soluble Resin)

A water-soluble resin composition containing the water-soluble resin may contain a salt (component ß) different from the water-soluble resin.

The component β is, from the viewpoint of improving the solubility in neutral water and the heat resistance of the water-soluble resin composition, preferably an organic salt compound represented by the following general formula (2):

$$(R^1\text{—}SO_3^-)_n X^{n+} \quad (2)$$

In the general formula (2), $R^1$ represents a hydrocarbon group having 1 to 30 carbon atoms that may have a substituent, n represents a number of 1 or 2, when n is 1, $X^{n+}$ represents a sodium ion, a potassium ion, a lithium ion, an ammonium ion, or a phosphonium ion, and when n is 2, $X^{n+}$ represents a magnesium ion, a calcium ion, a barium ion, or a zinc ion.

In the general formula (2), from the viewpoint of improving the solubility in neutral water and the heat resistance of the water-soluble resin composition, $R^1$ represents a hydrocarbon group that may have a substituent, and has 1 to 30 carbon atoms including the substituent. The hydrocarbon group may be any one of an aliphatic hydrocarbon group, an alicyclic hydrocarbon group, and an aromatic hydrocarbon group. When the hydrocarbon group is an aliphatic hydrocarbon group, the number of carbon atoms of the hydrocarbon group is, from the viewpoint of improving the solubility in neutral water and the heat resistance of the water-soluble resin composition, preferably 1 or more, more preferably 4 or more, and further preferably 8 or more, and preferably 30 or less, more preferably 25 or less, and further preferably 20 or less. When the hydrocarbon group is an alicyclic hydrocarbon group, the number of carbon atoms of the hydrocarbon group is, from the viewpoint of improving the solubility in neutral water and the heat resistance of the water-soluble resin composition, preferably 3 or more, more preferably 5 or more, further preferably 6 or more, and still further preferably 10 or more, and preferably 30 or less, more preferably 25 or less, and further preferably 20 or less. When the hydrocarbon group is an aromatic hydrocarbon group, the number of carbon atoms of the hydrocarbon group is, from the viewpoint of improving the solubility in neutral water and the heat resistance of the water-soluble resin composition, preferably 6 or more, more preferably 8 or more, and further preferably 10 or more, and preferably 30 or less, and more preferably 25 or less.

Besides, the substituent preferably contains, from the viewpoint of improving the solubility in neutral water and the heat resistance of the water-soluble resin composition, one or more selected from the group consisting of a carbon atom, an oxygen atom, a nitrogen atom, a sulfur atom, a phosphorus atom, a silicon atom, and a halogen atom, and in particular, is preferably a hydrocarbon group having 1 to 22 carbon atoms, or a halogenated alkyl group having 1 to 22 carbon atoms, more preferably a hydrocarbon group having 1 to 16 carbon atoms, or a halogenated alkyl group having 1 to 22 carbon atoms, further preferably a hydrocarbon group or a halogenated alkyl group having 1 to 12 carbon atoms, and still further preferably a hydrocarbon group having 1 to 12 carbon atoms.

In the general formula (2), from the viewpoint of improving the solubility in neutral water and the heat resistance of the water-soluble resin composition, $X^{n+}$ represents a sodium ion, a potassium ion, a lithium ion, an ammonium ion, a phosphonium ion, a magnesium ion, a calcium ion, a barium ion, or a zinc ion, is preferably a sodium ion, a potassium ion, a lithium ion, a magnesium ion, an ammonium ion, or a phosphonium ion, more preferably a sodium ion, a lithium ion, an ammonium ion, or a phosphonium ion, further preferably a lithium ion, or a phosphonium ion, and still further preferably a phosphonium ion. Among phosphonium ions, from the viewpoint of improving the solubility in neutral water and the heat resistance of the water-soluble resin composition, a tetraalkylphosphonium ion is preferred, and a tetrabutylphosphonium ion is further preferred.

In the general formula (2), n is preferably 1 from the viewpoint of improving the solubility in neutral water and the heat resistance of the water-soluble resin composition.

As for the content of the organic salt compound in the water-soluble resin composition, from the viewpoint of improving the solubility in neutral water of the water-soluble resin composition, a ratio of an amount of substance (mol) of an alkyl sulfonic acid ion ($R^1$—$SO_3$) of the organic salt compound to a sum of an amount of substance (mol) of a hydroxyl group of the water-soluble resin and an amount of substance (mol) of a sulfonic acid base of the water-soluble resin (amount of substance of alkyl sulfonic acid ion of organic salt compound/sum of amount of substance of hydroxyl group and amount of substance of sulfonic acid base of water-soluble resin) is preferably 0.005 or more, more preferably 0.01 or more, further preferably 0.02 or more, and still further preferably 0.03 or more, and from the viewpoint of improving the heat resistance of the water-soluble resin composition, is preferably 0.35 or less, more preferably 0.25 or less, and further preferably 0.2 or less.

(Compatibilizer (Component γ))

The water-soluble resin may be in the form of a water-soluble resin composition containing a compatibilizer. Examples of the compatibilizer include Bondfast® 7B and Bondfast 7M (both manufactured by Sumitomo Chemical Co., Ltd.), LOTADER® AX8840 (manufactured by Arkema), JONCRYL® ADR4370X, JONCRYL ADR4368CS, JONCRYL ADR4368F and JONCRYL ADR4300S (all manufactured by BASF), and ARUFON® UG4035, ARUFON UG4040 and ARUFON UG4070 (all manufactured by Toagosei Co., Ltd.). Examples of a reactive compatibilizer having an acid anhydride group include UMEX® 1010 (manufactured by Sanyo Chemical Industries, Ltd.), ADMER® (manufactured by Mitsui Chemicals, Inc.), MODIPER® A8200 (manufactured by Nippon Oil & Fats Co., Ltd.), OREVAC® (manufactured by Arkema), FG1901 and FG1924 (both manufactured by Kraton Polymers), and Tuftec® M1911, Tuftec M1913 and Tuftec M1943 (all manufactured by Asahi Kasei Chemicals Corporation). An example of a reactive compatibilizer having an isocyanate group includes Carbodilite® L manufactured by Nisshinbo.

The content of the component γ in the water-soluble resin composition with respect to 100 parts by mass of the component α is, from the viewpoint of layer strength of the printed layer 7 and the like, preferably 1 part by mass or more, more preferably 2 parts by mass or more, and further preferably 3 parts by mass or more, and from the same viewpoint, preferably 20 parts by mass or less, and more preferably 10 parts by mass or less.

The water-soluble resin composition may contain another component as long as the effects of the present invention are not impaired. Examples of such another component include resins different from the component α, a plasticizer such as polyalkylene glycol diester of benzoic acid, a filler such as calcium carbonate, magnesium carbonate, glass sphere, graphite, carbon black, carbon fiber, glass fiber, talc, wollastonite, mica, alumina, silica, kaolin, whisker, or silicon carbide, and an elastomer.

Examples of the elastomer include an acrylic-based elastomer, an olefin-based elastomer, a styrene-based elastomer, a polyester-based elastomer, a urethane-based elastomer, a polyamide-based elastomer, and a silicone-based elastomer. Among these, one or more selected from the group consisting of an acrylic-based elastomer and a styrene-based elastomer is preferred, and an acrylic-based elastomer is more preferred. The styrene-based elastomer is preferably one or more selected from the group consisting of a styrene-butadiene copolymer and a styrene-butadiene-ethylene copolymer. The acrylic-based elastomer is preferably a methacrylic acid-acrylic acid alkyl copolymer. Examples of a commercially available product of the elastomer include Kurarity® LA2250, Kurarity LA2140 and Kurarity LA4285 (all manufactured by Kuraray Co., Ltd.). Examples of the olefin-based elastomer include Kraton® ERS polymer (manufactured by Kraton Polymers), Kraton A polymer and Kuraton G polymer (both manufactured by Kraton Polymers), "Tuftec H" series and "Tuftec P" series (manufactured by Asahi Kasei Chemicals Corporation), and SEPTON® and HYBRAR® (both manufactured by Kuraray Plastics Co., Ltd.).

The content of the elastomer in the water-soluble resin composition with respect to 100 parts by mass of the component α is, from the viewpoint of improving the layer strength of the printed layer 7 and the like, preferably 0.1 parts by mass or more, more preferably 1 part by mass or more, and more preferably 10 parts by mass or more, and from the same viewpoint, preferably 100 parts by mass or less, more preferably 60 parts by mass or less, and further preferably 40 parts by mass or less, and still further preferably 20 parts by mass or less.

The temperature-responsive water-soluble resin that is an example of the material soluble in warm water of 30° C. or more, and the water-soluble resin composition containing the water-soluble resin have been thus described in detail so far.

In the first aspect, in order that the printed layer 7 can be removed and eliminated by washing with an aqueous solvent, the printed layer 7 is preferably formed not between the laminated layers of the first resin layer 1 and between the laminated layers of the second resin film layer 2 but selectively on at least one surface selected from the outside surface 11 and the inside surface 13 of the first resin film layer 1 and the outside surface 21 and the inside surface 23 of the second resin film layer 2. In other words, a structure in which the printed layer 7 is not included between the laminated layers of the first resin film layer 1 and between the laminated layers of the second resin film layer 2 is preferred.

Besides, when the container is made of the sheet material further including the third film layer 3 made of a resin material, a structure in which the printed layer 7 is not included between the laminated layers of the first resin film layer 1, between the laminated layers of the second resin film layer 2, and between the laminated layers of the third film layer is preferred.

For example, a structure in which the printed layer 7 is formed on the outside surface 11 of the first resin film layer 1 is employed.

This structure will be described in more detail with reference to FIG. 5, and in this structure, the printed layer 7 is formed on the outside surface 11 of the first resin film layer 1, namely, on the surface of the substrate layer 1-1 of the first resin film layer 1 opposite to the surface opposing the second resin film layer 2. The printed layer 7 includes the underlayer 7-3 formed on the surface of the substrate layer 1-1 and soluble in an aqueous solvent, the ink layer 7-2 formed on the surface of the underlayer 7-3, and the coating layer 7-1 formed on the surface of the ink layer 7-2 in the stated order in the inside-to-outside direction of the container, and is removable, as the printed layer 7, by washing with an aqueous solvent.

A structure in which the printed layer 7 is formed in portions of the inside surface 13 of the first resin film layer 1 and/or the outside surface 21 of the second resin film layer 2 excluding a attached surface 6 of the film attached portion is described as a modification.

This structure will be described in more detail with reference to FIG. 6, and in this modification, the ink layer 7-2 is formed as the printed layer 7 in a portion of the inside surface 13 of the first resin film layer 1, namely, a surface of the substrate layer 1-4 of the first resin film layer 1 opposing the second resin film layer 2, excluding the attached surface 6 of the film attached portion. Besides, the ink layer 7-2 is further formed as the printed layer 7 in a portion of the outside surface 21 of the second resin film layer 2, namely, a surface of the substrate layer 2-5 of the second resin film layer 2 opposing the first resin film layer 1, excluding the attached surface 6 of the film attached portion. These ink layers 7-2 are made of a material in which at least a part of a binder resin is soluble in an aqueous solvent.

A structure in which the printed layer 7 is formed on the surface of the film layer opposing the containing region (on the inside surface 23 of the second resin film layer 2 when the containing region is formed by forming the second resin film layer 2 into a bag) is described as another modification. In the container having this structure, the printed layer 7 can be removed, in recycling, simultaneously with washing away the content adhering/remaining on the surface of the containing region.

[Structure of Container to be Collected in Second Aspect]

Next, referring to FIGS. 7 and 8, the structure of the container to be collected in the second aspect of the method for recycling containers of the present embodiment will be described in more detail.

The container to be collected in the second aspect is made of the sheet material including a plurality of layered film layers including the first resin film layer 1, the second resin film layer 2, and the third film layer 3 made of a resin material and/or a non-resin material. The containing region is formed for directly accommodating the content inside the third film layer 3, namely, accommodating the content to be in direct contact with the third film layer 3, and in the same manner as in the first aspect, the container includes the film attached portion and the filler enclosed portion 5 between the first resin film layer 1 and the second resin film layer 2.

Specifically, the container is made of the sheet material including a plurality of layered film layers including the first resin film layer 1 corresponding to the outermost film layer, the second resin film layer 2 disposed inside the first resin film layer 1, and the third film layer 3 disposed inside the second resin film layer 2 and made of a resin material and/or a non-resin material. In other words, the second resin film layer 2 is disposed inside the first resin film layer 1 corresponding to the outermost film layer, the third film layer 3 is disposed inside the second resin film layer 2, and the containing region (inner container formed by the third film layer 3) for accommodating the content formed into a bag by attaching at least a part of the periphery of the sheet material is present inside the third film layer 3.

In the third film layer 3 forming the inner container, the spout 103 or the like may be provided as an opening. Besides, when the third film layer 3 and the second resin film layer 2 are not attached to each other as a whole, or the third film layer 3 and the second resin film layer 2 are attached to each other in at least a part thereof, the inner container is easily shrunk in using the content, so that the content can be easily completely used up. Even when the third film layer 3 and the second resin film layer 2 are not attached to each other as a whole, however, a structure in which the third film layer 3 working as the inner container is retained inside the second resin film layer 2 is preferred. In addition, the outside air introducing portion for introducing outside air may be provided between the third film layer 3 and the second resin film layer 2 so as to easily shrink the inner container as described above.

When the second resin film layer 2 and the third film layer 3 are attached in at least a part thereof, the attaching between the second resin film layer 2 and the third film layer 3 is preferably more easily detachable than the film attached portion where the first resin film layer 1 and the second resin film layer 2 are attached to each other.

In particular, the attaching between the second resin film layer 2 and the third film layer 3 more preferably employs a structure in which surfaces included in the inside surface 23 of the second resin film layer 2 and/or the outside surface 31 of the third film layer 3, having been subjected to an easily detachable treatment of any one of a corona treatment, a powder treatment, and an oil treatment using silicone or the like, are attached to each other by heat sealing or the like, or a structure in which an easy peelable substrate layer is used for the attaching as a attaching layer between the second resin film layer 2 and the third film layer 3. More preferably, a structure in which surfaces included in at least a part of the inside surface 23 of the second resin film layer 2 and the outside surface 31 of the third film layer 3, having been subjected to a corona treatment, are attached to each other by heat sealing is employed. When such a structure is employed, the first resin film layer 1 and the second resin film layer 2 (outer container) including the film attached portion can be easily separated from the third film layer 3 (inner container).

Each of the first resin film layer 1, the second resin film layer 2, and the third film layer 3 of the container to be collected in the second aspect is a substrate layer working as a substrate of the sheet material, and at least the first resin film layer 1 and the second resin film layer 2 are resin substrate layers made of a resin material. Examples of the resin material include those described as suitable materials of the first resin film layer 1 and the second resin film layer 2 of the first aspect. Also similarly, each of these layers may be made of a single substrate layer (layer working as the substrate of the film), or may be in a structure in which a plurality of substrate layers, or a plurality of substrate layers and other layers (such as an added layer and a bonded layer) are laminated. Besides, the laminating may employ either of a structure in which layers are laminated by heat seal bonding (not including a lamination bonded layer), or a structure including a lamination bonded layer laminated by bonding by dry lamination, extrusion lamination, coextrusion molding or the like.

Besides, the third film layer 3 to be separated may be made of, but is not limited to, a resin material, and may be made of a non-resin material such as a metal material (such as an aluminum film, a copper film or the like), a paper material, stone paper, or ceramics.

For example, an example of the structure of the sheet material of the container to be collected in the second aspect includes the following layer structure.

The third film layer 3 forming the inner container has, for example, as illustrated in FIGS. 7 and 8, a three-layer structure obtained by laminating a substrate layer 3-1, a substrate layer 3-2, and a substrate layer 3-3 in the stated order.

Among these layers, the substrate layer 3-1 is made of, for example, linear low density polyethylene. As the principal function, the substrate layer 3-1 ensures heat sealability to the outer container (heat sealability to the second resin film layer 2 forming the outer container).

The substrate layer 3-2 is, for example, a layer of transparent deposited oriented nylon, formed on a surface of the substrate layer 3-2 on the side of the substrate layer 3-1, made of oriented nylon on which silica and/or alumina are vapor deposited. As the principal function, the substrate layer 3-2 ensures a gas barrier property and pinhole resistance.

The substrate layer 3-3 is made of, for example, linear low density polyethylene. As the principal function, the substrate layer 3-3 ensures the heat sealability between the third film layer 3.

The layer structure of the third film layer 3 is not limited to that described here. Besides, examples of the structures of the first resin film layer 1 and the second resin film layer 2 include those similar to the structures described above with respect to the container to be collected in the first aspect.

Besides, also in this second aspect, both the first resin film layer 1 and the second resin film layer 2 to be collected preferably contain materials made of the same type of resins. The materials are preferably any one of polyethylene-based materials such as high density polyethylene (HDPE), middle density polyethylene (MDPE), low density polyethylene (LDPE), linear low density polyethylene (LLDPE), ultra low density polyethylene (ULDPE), and an ethylene-vinyl alcohol copolymer (EVOH), polypropylene-based materials such as oriented polypropylene (OPP), cast polypropylene (CPP), isotactic PP, syndiotactic PP, atactic PP, random PP, and block PP, polyester-based materials such as polyethylene terephthalate (PET), amorphous polyethylene terephthalate (amorphous PET), polybutylene terephthalate (PBT), polyethylene naphthalate (PEN), and polybutylene naphthalate (PBN), and polyamide-based materials such as oriented nylon (ONy), cast nylon (CNy), nylon 6, nylon 66, nylon 11, nylon 12, and MXD6, and are particularly preferably any one of the polyethylene-based materials. Since the container to be separately collected is made of the polyethylene-based materials, a recycling system for polyethylene-based materials can be constructed, and thus, physical properties and qualities of a recycled material are thus further improved.

Besides, it is more preferable to separately collect a container in which the outermost layer disposed on the outermost side in the first resin film layer 1 of the sheet material is made of polyethylene terephthalate (PET) or the like, layers excluding the outermost layer of the first resin film layer 1 are made of polyvinyl alcohol (PVA), and the second resin film layer 2 of the sheet material is made of polyvinyl alcohol (PVA). Since polyvinyl alcohol can be dissolved and removed by washing, a recycling system for polyethylene terephthalate can be thus constructed, and the physical properties and quantities of a recycled material can be thus further improved.

It is very preferable to separately collect a container having a structure, for example, in which the first resin film layer 1 includes a substrate layer 1-1 made of PET and a substrate layer 1-2 made of PVA laminated in the stated order from the outside surface 11 to the inside surface 13, and the second resin film layer 2 is a single layer made of PVA, and thus, recycling to a polyethylene terephthalate material is easy.

In the container to be collected in the second aspect, it is preferable that the printed layer 7 including the ink layer 7-2 and removable from the surface of the film layer by washing with an aqueous solvent is formed at least one surface selected from the outside surface 11 and the inside surface 13 of the first resin film layer 1, the outside surface 21 and the inside surface 23 of the second resin film layer 2, and the outside surface 31 and the inside surface 33 of the third film layer 3. Thus, the printed layer 7 can be easily removed by washing with an aqueous solvent from the shreds of collected containers, and coloring of a recycled resin formed by using the washed shreds can be inhibited.

Here, also the printed layer 7 of the container to be collected in the second aspect is, in the same manner as in the first aspect described above, a layer including at least the ink layer 7-2 made of a printing ink, and may include, in addition to the ink layer 7-2, the coating layer 7-1 having a function to protect the ink layer 7-2, and the like. The ink layer 7-2 can be formed by, for example, offset printing, screen printing, gravure printing, flexographic printing, or the like. The coating layer 7-1 may be a medium printed layer, that is, a colorless printed layer.

Also in the second aspect, for further accelerating the removal of the printed layer 7, a layer working as an underlayer for the printed layer 7 and having a function to make an ink well taken may be provided, as a layer (added layer) different from the substrate layer of the film layer, on the surface of the film layer where the printed layer 7 is formed.

Besides, also in the same manner in the first aspect described above, the printed layer 7 may have any structure, such as the structure including the underlayer 7-3 soluble in an aqueous solvent, the ink layer 7-2 formed on the surface of the underlayer 7-3, and the coating layer 7-1 formed on the surface of the ink layer 7-2 and soluble in the aqueous solvent, as long as the printed layer 7 can be removed by washing with the aqueous solvent.

Also in the same manner as in the first aspect described above, the printed layer 7 is preferably made of a material removable from the surface of the film layer by washing with warm water of 30° C. or more, preferably 40° C. or more, more preferably 50° C. or more, and further preferably 60° C. or more. Similarly, the thickness of the printed layer 7 is preferably 0.5 μm or more. For further easing the removal by washing, the thickness is preferably 30 μm or less, and more preferably 10 μm or less.

Also in the second aspect, in order that the printed layer 7 can be removed and eliminated by washing with an aqueous solvent, the printed layer 7 is preferably formed not between the laminated layers of the first resin layer 1 and between the laminated layers of the second resin film layer 2 but selectively on at least one surface selected from the outside surface 11 and the inside surface 13 of the first resin film layer 1 and the outside surface 21 and the inside surface 23 of the second resin film layer 2. In other words, a structure in which the printed layer 7 is not included between the laminated layers of the first resin film layer 1 and between the laminated layers of the second resin film layer 2 is preferred.

Besides, a structure in which the printed layer 7 is not included between the laminated layers of the third film layer 3 is more preferred.

For example, a structure in which the printed layer 7 is formed on the outside surface 11 of the first resin film layer 1 and/or the inside surface 23 of the second resin film layer 2 is employed.

This structure will be described in more detail with reference to FIG. 7, and in this structure, the printed layer 7 is formed on the outside surface 11 of the first resin film layer 1, namely, the surface of the substrate layer 1-1 of the first resin film layer 1 opposite to the surface opposing the second resin film layer 2, and the printed layer 7 is formed on the inside surface 23 of the second resin film layer 2, namely, on the surface of the substrate layer 2-4 of the second resin film layer 2 opposing the third film layer 3. These printed layers 7 include the underlayer 7-3 soluble in an aqueous solvent, and hence are removable by washing with the aqueous solvent.

When the container having such a structure is collected, the first resin film layer 1 and the second resin film layer 2 are separated, and the resultant is shredded and washed, the printed layer 7 is very easily removed.

Alternatively, an example of a structure in which the printed layer 7 is formed on the inside surface 23 of the second resin film layer 2 and/or the outside surface 31 of the third film layer 3 is also employed.

This structure will be described in detail with reference to FIG. 8, and in this structure, the ink layer 7-2 is formed, as the printed layer 7, on the inside surface 23 of the second resin film layer 2, namely, the surface of the substrate layer 2-4 of the second resin film layer 2 opposing the third film layer 3, and the ink layer 7-2 is formed, as the printed layer 7, on the outside surface 31 of the third film layer 3, namely, on the surface of the substrate layer 3-1 of the third film layer 3 opposing the second resin film layer 2. These ink layers 7-2 are made of a material in which at least a part of a binder resin is soluble in an aqueous solvent.

In this structure, a character printed layer (preferably, a character printed layer having an area of preferably less than 50% and more preferably less than 30% of the area of the inside surface 23 of the second resin film layer 2) in which characters indicating the content and its ingredients are displayed is formed, for example, on the inside surface 23 of the second resin film layer 2, and a pattern printed layer (preferably, a pattern printed layer not including characters) in which a figure, a pattern or the like is printed is formed on the outside surface 31 of the third film layer 3. This structure is extremely suitable because the first resin film layer 1 and the second resin film layer 2 are separately collected from the container to be shredded, and then, the character printed layer alone may be removed from the shreds by washing.

[Respective Steps of Method for Recycling Containers of Present Embodiment]

Next, referring to FIGS. 1 to 4, the respective steps of the method for recycling containers of the present embodiment will be described in detail.

The method for recycling containers of the present embodiment includes at least the collecting step (1), the shredding and washing step (2), the recycled resin forming step (3), and the sheet material forming step (4). These steps will now be specifically described.

<Collecting Step (1)>

In the method for recycling containers of the present embodiment, the container as illustrated in, for example, FIG. 1, FIGS. 2(a) and 2(b), or FIG. 4(a) is first collected. This container includes the filler enclosed portion 5, and hence is easily collected separately from other containers. The term "to collect a container" herein includes not only collection of the container including the filler enclosed therein but also collection, from the container including the filler enclosed therein, of a container main body with the filler removed, and collection, from the container including the filler enclosed therein or the container main body with the filler removed, of a material from which the spout 103, the top gusset portion 102, the cap and the like have been removed. Besides, in the modification (second aspect), it includes separate collection, from the container including the filler enclosed therein or the container main body with the filler removed, of the first resin film layer 1 and the second resin film layer 2 (outer container) as illustrated in FIG. 3 and FIG. 4(b). In other words, the container to be collected in the collecting step includes the container including the filler enclosed therein, the container main body with the filler removed, and the outer container of these. When the outer container is separately collected, a recyclable material and a recycled material having a better quality can be obtained.

<Shredding and Washing Step (2)>

Next, as illustrated in FIG. 2 and FIGS. 4(c) and 4(d), the container, the container main body or the outer container thereof having been collected in the collecting step is shredded into shreds, and the shreds are washed with washing water containing an aqueous solvent, such as alkaline water, acid water or warm water, or with an organic solvent to remove the printed layer 7, or a residue of the content and the printed layer 7. In the second aspect described above, the first resin film layer 1 and the second film layer 2 not in contact with the containing region are separately collected, and hence there is no need to remove a residue of the content.

Here, in the shredding and washing step, the container, the container main body, or the outer container thereof having been collected in the collecting step is shredded into pieces having a long side of preferably 100 mm or less, and more preferably 60 mm or less because thus the printed layer 7 can be very easily removed by washing.

Besides, from the viewpoint of reducing environmental load, the container formed the printed layer 7 removable by washing with an aqueous solvent is collected in the collecting step described above, and in this shredding and washing step, after shredding the collected container, the printed layer 7 and the like are preferably removed from the shreds by washing with warm water of 30° C. or more. From the viewpoint of efficiently removing the printed layer 7, the temperature of the warm water used in the shredding and washing step is preferably 30° C. or more, more preferably 40° C. or more, further preferably 50° C. or more, and still further preferably 60° C. or more. The upper limit of the temperature of the warm water is, from the viewpoint of easing temperature control in the recycling step, preferably 100° C. or less, more preferably 90° C. or less, and further preferably 80° C. or less. As a washing method employed here, for example, the shreds are put and stirred in a washing tank together with the washing water, the resultant is rinsed if necessary, and then subjected to physical dehydration (centrifugation or the like) and dried.

<Recycled Resin Forming Step (3)>

Next, as illustrated in FIG. 2 and FIG. 4(e), the shreds, that is, a recyclable raw material, having been shredded and washed in the shredding and washing step for removing the printed layer 7 and the like are used to form a recycled resin such as a resin pellet. Since the shreds from which the printed layer 7 has been removed are thus used as the raw material, a recycled resin to be obtained is minimally colored with an ink, and a recyclable material recyclable into a container can be obtained as the recycled resin. As a method for forming the recycled resin, for example, a method in which the washed shreds are melted to be molded into a resin pellet by extrusion, pressing or the like is employed.

In this recycled resin forming step, for example, a new resin raw material (virgin material) may be used as a principal raw material to be mixed with the shreds and another recyclable raw material for forming the recycled resin. Alternatively, even when the shreds washed for removing the printed layer 7 in the shredding and washing step are used as the principal raw material for forming the recycled resin, the recycled resin is minimally colored with an ink, and thus, a recyclable material very stable in the physical properties and quality can be obtained.

Here, the term "principal raw material" means a material contained in raw materials for forming the recycled resin in a content of 80% by mass or more, and the content may be 90% by mass or more, may be 95% by mass or more, or may be 100% by mass.

<Sheet Material Forming Step (4)>

Furthermore, as illustrated in FIG. 2 and FIG. 4(f), at least the recycled resin (such as the resin pellet) formed in the recycled resin forming step is used to form at least a part of the sheet material that can constitute a container in which a filler can be enclosed. This sheet material includes a plurality of layered film layers including at least the first resin film layer 1 and the second resin film layer 2, and includes, between the first resin film layer 1 and the second resin film layer 2, the film attached portion where these film layers are attached to each other, and the filler enclosed portion 5 that is partially not attached so that a filler can be enclosed therein.

It is preferable, in the sheet material forming step, that at least a part of the first resin film layer 1 and/or the second resin film layer 2 is formed by using the recycled resin. When the container made of the thus obtained sheet material of the recycled material includes an inner container, the recycled film is not in contact with a content, and hence impurities contained in the recycled film are difficult to be mixed in the content.

Besides, it is preferable, in the sheet material forming step, that at least a part of the first resin film layer 1 is formed by using the recycled resin. Even when the container made of the thus obtained sheet material of the recycled material does not include an inner container, impurities contained in the recycled film are thus difficult to be mixed in the content. In particular, in recycling a container to which the content adheres, the above-described structure is very preferably employed.

As described above, the method for recycling containers of the present embodiment may further include a "container forming step (5) of forming, by using the sheet material formed in the sheet material forming step, a container in which a filler is enclosed in the filler enclosed portion 5".

In this manner, a recycling system in which a container (filler enclosed container) with a content accommodated therein used up is recycled, as a recyclable raw material, into a container including a filler enclosed therein can be constructed.

The present embodiment encompasses the following technical ideas:

<1> A method for recycling containers, comprising the following steps (1) to (4): a collecting step (1) of collecting containers, each of which is made of a sheet material including a plurality of layered film layers including a first resin film layer and a second resin film layer, is formed into a bag by attaching at least a part of a periphery portion of the sheet material to form a containing region for accommodating a content inside the second resin film layer, and includes, between the first resin film layer and the second resin film layer, a film attached portion where the first resin film layer and the second resin film layer are attached to each other, and a filler enclosed portion that encloses a filler and bulged out to a thickness direction of the sheet material than the film attached portion; a shredding and washing step (2) of shredding the containers collected in the collecting step to obtain shreds, and washing the shreds; a recycled resin forming step (3) of forming a recycled resin by using the shreds shredded and washed in the shredding and washing step; and a sheet material forming step (4) of forming at least a part of the sheet material by using the recycled resin formed in the recycled resin forming step.

<2> The method for recycling containers according to <1>, wherein the second resin film layer is disposed inside the first resin film layer in each of the containers of the collecting step.

<3> The method for recycling containers according to <1> or <2>, wherein in each of the containers of the collecting step, a printed layer including an ink layer is formed on at least one surface selected from an outside surface and an inside surface of the first resin film layer, and an outside surface and an inside surface of the second resin film layer, and the printed layer is removable from the surface of the film layer in the shreds by washing with an aqueous solvent performed in the shredding and washing step.

<4> The method for recycling containers according to <3>, wherein the shredding and washing step includes a step of removing the printed layer from the shreds by washing with warm water of 30° C. or more, preferably 40° C. or more, more preferably 50° C. or more, and further preferably 60° C. or more.

<5> The method for recycling containers according to <1> or <2>, wherein each of the containers of the collecting step is made of the sheet material including the first resin film layer, the second resin film layer, and a third film layer made of a resin material, and at least a part of a periphery of the sheet material is attached for forming a bag to form the containing region for accommodating the content inside the third film layer.

<6> The method for recycling containers according to <1> or <2>, wherein each of the containers of the collecting step is made of the sheet material including the first resin film layer, the second resin film layer, and a third film layer made of a resin material and/or a non-resin material, at least a part of a periphery of the sheet material is attached for forming a bag to form the containing region for accommodating the content inside the third film layer, and the first resin film layer and the second resin film layer are separately collected from each of the containers in the collecting step.

<7> The method for recycling containers according to <5> or <6>, wherein in each of the containers of the collecting step, the second resin film layer is disposed inside the first resin film layer, and the third film layer is disposed inside the second resin film layer.

<8> The method for recycling containers according to any one of <5> to <7>, wherein in each of the containers of the collecting step, the second resin film layer and the third film layer are attached to each other in at least a part, and attaching between the second resin film layer and the third film layer is easily detachable as compared with attaching in the film attached portion.

<9> The method for recycling containers according to <8>, wherein the attaching between the second resin film layer and the third film layer is attaching by heat sealing between corona-treated surfaces provided in at least a part of an inside surface of the second resin film layer and an outside surface of the third film layer.

<10> The method for recycling containers according to any one of <5> to <9>, wherein in each of the containers of the collecting step, a printed layer including an ink layer is formed on at least one surface selected from an outside surface and an inside surface of the first resin film layer, an outside surface and an inside surface of the second resin film layer, and an outside surface and an inside surface of the third film layer, and the printed layer is removable from the surface of the film layer in the shreds by washing with an aqueous solvent performed in the shredding and washing step.

<11> The method for recycling containers according to <10>, wherein the shredding and washing step includes a step of removing the printed layer from the shreds by washing with warm water of 30° C. or more, preferably 40° C. or more, more preferably 50° C. or more, further preferably 60° C. or more, and 100° C. or less, preferably 90° C. or less, and more preferably 80° C. or less.

<12> The method for recycling containers according to any one of <1> to <11>, wherein the containers collected in the collecting step are shredded into pieces having a long side of 100 mm or less, and preferably 60 mm or less in the shredding and washing step.

<13> The method for recycling containers according to any one of <1> to <12>, wherein the sheet material forming step is a step of forming, by using the recycled resin, at least a part of the first resin film layer and/or the second resin film layer of the sheet material.

<14> The method for recycling containers according to <13>, wherein the sheet material forming step is a step of forming, by using the recycled resin, at least a part of the first resin film layer of the sheet material.

<15> The method for recycling containers according to any one of <1> to <14>, wherein the recycled resin forming step is a step of forming the recycled resin by using the washed shreds as a principal raw material.

<16> The method for recycling containers according to any one of <1> to <15>, wherein each of the containers of the collected step contains materials made of the same type of resins in all the film layers of the sheet material, the materials made of the same type of resins are polyethylene-based materials, and the polyethylene-based materials are at least one selected from the group consisting of high density polyethylene (HDPE), middle density polyethylene (MDPE), low density polyethylene (LDPE), linear low density polyethylene (LLDPE), ultra low density polyethylene (ULDPE), and an ethylene-vinyl alcohol copolymer (EVOH).

<17> The method for recycling containers according to any one of <1> to <15>, wherein in each of the containers of the collecting step, layers of the sheet material excluding an outermost layer positioned on an outer side in the first resin film layer are made of polyvinyl alcohol (PVA), and the film layers of the sheet material excluding the first resin film layer are all made of polyvinyl alcohol (PVA).

<18> A container made of the sheet material formed by the method for recycling containers according to any one of <1> to <17>, and comprising a filler enclosed in the filler enclosed portion.

REFERENCE SIGNS LIST 1 first resin film layer
2 second resin film layer
3 third film layer
5 filler enclosed portion
6 attached surface of film attached portion
7 printed layer
7-1 coating layer
7-2 ink layer
7-3 underlayer
11 outside surface of first resin film layer
13 inside surface of first resin film layer
21 outside surface of second resin film layer
23 inside surface of second resin film layer
31 outside surface of third film layer
33 inside surface of third film layer
101 bottom gusset portion
102 top gusset portion
103 spout

The invention claimed is:

1. A method for recycling containers, comprising the following steps:
   a collecting step of collecting containers, each of which:
     is made of a sheet material including a plurality of layered film layers including a first resin film layer and a second resin film layer,
     is formed into a bag by attaching at least a part of a periphery of the sheet material to form a containing region for accommodating a content inside the second resin film layer, and
     includes:
       a film attached portion where the first resin film layer and the second resin film layer are attached to each other, and
       a filler enclosed portion, between the first resin film layer and the second resin film layer, that encloses a filler and is bulged out to a thickness direction of the sheet material more than the film attached portion, the filler enclosed portion being distinct from the containing region,
     wherein an outermost layer positioned on an outermost side in the first resin film layer is made of polyethylene terephthalate (PET) or nylon (Ny), an innermost layer positioned on an innermost side in the first resin film layer is made of polyvinyl alcohol (PVA), a layer in the second resin film layer that is positioned closest to the first resin film layer and opposite the layer positioned on a innermost side in the first resin film layer is made of polyvinyl alcohol,
     wherein in the film attached portion, the innermost layer positioned on an innermost side in the first resin film layer and the layer in the second resin film layer that is positioned closest to the first resin film layer are attached to each other,
     wherein in the filler enclosed portion, the innermost layer positioned on an innermost side in the first resin film layer and the layer in the second resin film layer that is positioned closest to the first resin film layer are facing each other with a filler therebetween;
   a shredding and washing step of shredding the containers collected in the collecting step to obtain shreds, and washing the shreds;
   a recycled resin forming step of forming a recycled resin by using the shreds shredded and washed in the shredding and washing step; and
   a sheet material forming step of forming at least a part of a new sheet material by using the recycled resin formed in the recycled resin forming step.

2. The method for recycling containers according to claim 1, wherein the second resin film layer is disposed inside the first resin film layer in each of the containers of the collecting step.

3. The method for recycling containers according to claim 1, wherein
   in each of the containers of the collecting step, a printed layer including an ink layer is formed on at least one surface selected from an outside surface and an inside surface of the first resin film layer, and an outside surface and an inside surface of the second resin film layer, and
   the printed layer is removable from the at least one surface in the shreds by washing with an aqueous solvent performed in the shredding and washing step.

4. The method for recycling containers according to claim 3, wherein the shredding and washing step includes a step of removing the printed layer from the shreds by washing with warm water of 30° C. or more.

5. The method for recycling containers according to claim 1, wherein
each of the containers of the collecting step is made of the sheet material including the first resin film layer, the second resin film layer, and a third film layer made of a resin material, and
at least the part of the periphery of the sheet material is attached for forming the bag to form the containing region for accommodating the content inside the third film layer.

6. The method for recycling containers according to claim 5, wherein in each of the containers of the collecting step, the second resin film layer is disposed inside the first resin film layer, and the third film layer is disposed inside the second resin film layer.

7. The method for recycling containers according to claim 5, wherein
in each of the containers of the collecting step, the second resin film layer and the third film layer are attached to each other in at least a part, and
an attaching between the second resin film layer and the third film layer is more easily detachable as compared with an attaching in the film attached portion.

8. The method for recycling containers according to claim 7, wherein the attaching between the second resin film layer and the third film layer is attaching by heat sealing between corona-treated surfaces provided in at least a part of an inside surface of the second resin film layer and an outside surface of the third film layer.

9. The method for recycling containers according to claim 5, wherein
in each of the containers of the collecting step, a printed layer including an ink layer is formed on at least one surface selected from an outside surface and an inside surface of the first resin film layer, an outside surface and an inside surface of the second resin film layer, and an outside surface and an inside surface of the third film layer, and
the printed layer is removable from the at least one surface in the shreds by washing with an aqueous solvent performed in the shredding and washing step.

10. The method for recycling containers according to claim 9, wherein the shredding and washing step includes a step of removing the printed layer from the shreds by washing with warm water of 30° C. or more.

11. The method for recycling containers according to claim 1, wherein
each of the containers of the collecting step is made of the sheet material including the first resin film layer, the second resin film layer, and a third film layer made of a resin material and/or a non-resin material,
at least the part of the periphery of the sheet material is attached for forming the bag to form the containing region for accommodating the content inside the third film layer, and
the first resin film layer and the second resin film layer are separately collected from each of the containers in the collecting step.

12. The method for recycling containers according to claim 1, wherein the containers collected in the collecting step are shredded into pieces having a long side of 100 mm or less in the shredding and washing step.

13. The method for recycling containers according to claim 1, wherein the sheet material forming step is a step of forming, by using the recycled resin, at least a part of a first resin film layer and/or a second resin film layer of the new sheet material.

14. The method for recycling containers according to claim 13, wherein the sheet material forming step is a step of forming, by using the recycled resin, at least the part of the first resin film layer of the new sheet material.

15. The method for recycling containers according to claim 1, wherein the recycled resin forming step is a step of forming the recycled resin by using the washed shreds as a principal raw material.

16. The method for recycling containers according to claim 1, wherein
in each of the containers of the collecting step, layers of the sheet material excluding an outermost layer positioned on an outer side in the first resin film layer are made of polyvinyl alcohol (PVA), and
the film layers of the sheet material excluding the first resin film layer are all made of polyvinyl alcohol (PVA).

17. A container made of the sheet material formed by the method for recycling containers according to claim 1, and comprising a filler enclosed in the filler enclosed portion.

18. The method for recycling containers according to claim 1, wherein the filler enclosed portion and the containing region overlap in the thickness direction.

* * * * *